(12) United States Patent
Xu et al.

(10) Patent No.: US 12,063,099 B2
(45) Date of Patent: Aug. 13, 2024

(54) CELL IDENTITY AND PAGING FOR NON-TERRESTRIAL NETWORKS (NTN)

(71) Applicant: Apple Inc., Cupertino, CA (US)

(72) Inventors: Fangli Xu, Beijing (CN); Sarma V. Vangala, Cupertino, CA (US); Chunxuan Ye, San Diego, CA (US); Haijing Hu, Cupertino, CA (US); Krisztian Kiss, Cupertino, CA (US); Murtaza A. Shikari, Cupertino, CA (US); Naveen Kumar R. Palle Venkata, San Diego, CA (US); Ralf Rossbach, Bavaria-Bayern (DE); Sree Ram Kodali, Cupertino, CA (US); Srinivasan Nimmala, Cupertino, CA (US); Vijay Venkataraman, Cupertino, CA (US); Yuqin Chen, Beijing (CN); Zhibin Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,093

(22) PCT Filed: Nov. 3, 2020

(86) PCT No.: PCT/CN2020/126146
§ 371 (c)(1),
(2) Date: Sep. 20, 2021

(87) PCT Pub. No.: WO2022/094754
PCT Pub. Date: May 12, 2022

(65) Prior Publication Data
US 2023/0261738 A1    Aug. 17, 2023

(51) Int. Cl.
*H04B 7/185*    (2006.01)
*H04W 48/16*    (2009.01)
(Continued)

(52) U.S. Cl.
CPC ........ *H04B 7/18519* (2013.01); *H04W 48/16* (2013.01); *H04W 68/02* (2013.01); *H04W 84/06* (2013.01)

(58) Field of Classification Search
CPC .. H04B 7/18519; H04W 48/16; H04W 68/02; H04W 84/06
(Continued)

(56) References Cited

U.S. PATENT DOCUMENTS 10,476,585 B1 *  11/2019  Torres ............... H04B 7/18513
2010/0080171 A1 *  4/2010  Rune ...................... H04L 12/66
370/328

(Continued)

FOREIGN PATENT DOCUMENTS

| CN | 110636609 A | 12/2019 |
| CN | 111294801 A | 6/2020 |
| CN | 111866970 A | 10/2020 |

OTHER PUBLICATIONS

International Search Report Dated Jul. 26, 2021 for International Application PCT/CN2020/126146.
(Continued)

*Primary Examiner* — Mark G. Pannell
(74) *Attorney, Agent, or Firm* — Eschweiler & Potashnik, LLC

(57) ABSTRACT

Techniques discussed herein may enable effective cell identification and paging within a non-terrestrial network (NTN). A base station may map logical cell identifiers, corresponding to satellites, to physical cell identifiers, corresponding to physical or geographic cells. The techniques enable cell identification and paging in both Earth-fixed cell scenarios and Earth-moving cell scenarios, and in scenarios where the satellite moves between countries.

20 Claims, 14 Drawing Sheets

(51) Int. Cl.
*H04W 68/02* (2009.01)
*H04W 84/06* (2009.01)

(58) Field of Classification Search
USPC .......................................................... 370/316
See application file for complete search history.

(56) References Cited

U.S. PATENT DOCUMENTS

| | | | | |
|---|---|---|---|---|
| 2011/0153844 A1* | 6/2011 | Bovo | ................... | H04W 24/02 |
| | | | | 709/228 |
| 2012/0003974 A1* | 1/2012 | Nylander | .............. | H04W 24/02 |
| | | | | 455/435.2 |
| 2014/0003391 A1* | 1/2014 | Vesterinen | ............ | H04W 28/14 |
| | | | | 370/328 |
| 2019/0082481 A1 | 3/2019 | Ravishankar et al. | | |
| 2019/0245614 A1* | 8/2019 | Lucky | ............... | H04W 36/0061 |
| 2020/0322787 A1* | 10/2020 | Sivavakeesar | ........ | H04W 24/02 |
| 2020/0412443 A1* | 12/2020 | Wang | ...................... | H04W 8/06 |
| 2021/0143897 A1* | 5/2021 | Edge | .................. | H04B 7/18513 |
| 2021/0218467 A1* | 7/2021 | Jin | ...................... | H04W 64/003 |
| 2022/0030504 A1* | 1/2022 | Shrestha | ............... | H04W 76/10 |
| 2022/0070811 A1* | 3/2022 | Tripathi | ............... | H04B 7/1851 |
| 2022/0109496 A1* | 4/2022 | Shrestha | ............ | H04B 7/18541 |
| 2022/0167294 A1* | 5/2022 | Zheng | ............ | H04W 56/0015 |
| 2022/0210765 A1* | 6/2022 | Cao | ........................ | H04W 68/02 |
| 2022/0240084 A1* | 7/2022 | Speidel | ............. | H04B 7/18565 |
| 2022/0279437 A1* | 9/2022 | Wigard | ................. | H04W 4/029 |
| 2023/0327748 A1* | 10/2023 | Rommer | ............. | H04B 7/1851 |
| | | | | 370/316 |

OTHER PUBLICATIONS

International Written Opinion Dated Jul. 26, 2021 for International Application PCT/CN2020/126146.
Zte, et al.; "Discussion on Network Identities"; NTN 3GPP TSG-RAN WG2 #103bis R2-1814244; Oct. 12, 2018.
Thales; Discussion on Earth fixed and moving cells in NTN; 3GPP TSG-RAN WG2 Meeting #112-e; R2-2009256; Nov. 2, 2020.
International Preliminary Report on Patentability Dated May 8, 2023 for International Application PCT/CN2020/126146.

* cited by examiner

CELL IDENTITY AND PAGING FOR NON-TERRESTRIAL NETWORKS (NTN)

REFERENCE TO RELATED APPLICATIONS

This application is a National Phase entry application of International Patent Application No. PCT/CN2020/126146, filed Nov. 3, 2020, entitled "CELL IDENTITY AND PAGING FOR NON-TERRESTRIAL NETWORKS (NTN), the contents of which are herein incorporated by reference in their entirety.

FIELD

This disclosure relates to wireless communication networks, and more specifically, to techniques for cell identification and paging in non-terrestrial networks (NTNs). Other aspects and techniques are also described.

BACKGROUND

As the quantity of mobile devices within wireless networks, and the demand for mobile data traffic, continue to increase, changes are made to system requirements and architectures to better address current and anticipated demands. Some wireless communication networks (e.g., fifth generation (5G) or new radio (NR) networks) may be developed to include non-terrestrial networks (NTN) comprising one or more satellites. In such scenarios, satellites may operate transparently by relaying signals between user equipment (UE) and base stations without demodulation/remodulation. Alternatively, satellites may operate regeneratively by using on-board processing capabilities to, for example, demodulate and remodulate signals between UE and base stations.

BRIEF DESCRIPTION OF THE DRAWINGS

The present disclosure will be readily understood and enabled by the detailed description below and accompanying drawings. Like reference numerals may designate like features and/or structural elements. The drawings are provided as non-limiting examples of implementations or aspects of the present disclosure.

DETAILED DESCRIPTION

Figure 1:
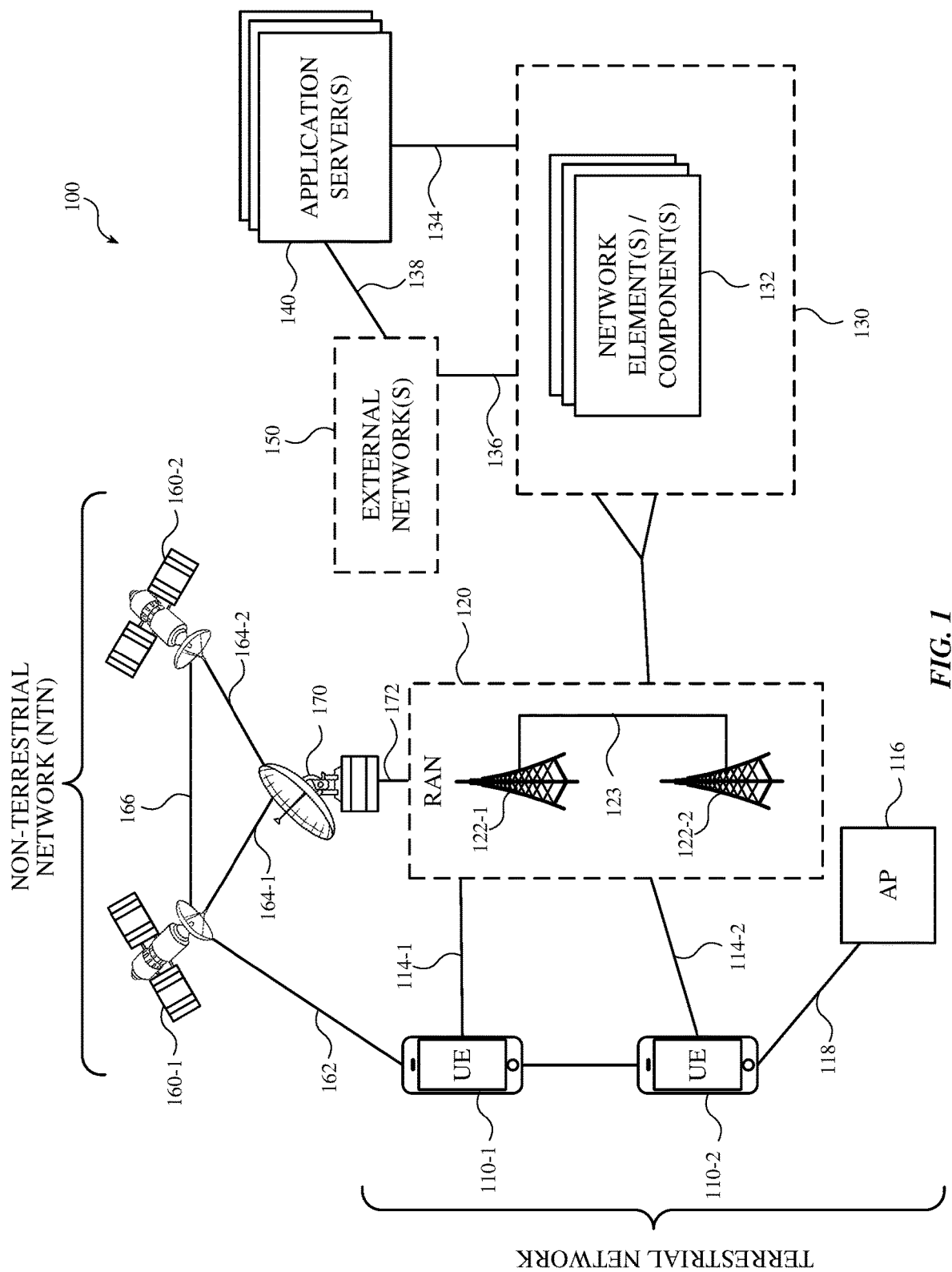
FIG. 1 is a diagram of an example network according to one or more implementations described herein.

The following detailed description refers to the accompanying drawings. Like reference numbers in different drawings may identify the same or similar features, elements, operations, etc. The present disclosure is not limited to the following description as other implementations may be utilized, and structural or logical changes made, without departing from the scope of the present disclosure. References to "an" or "one" example, implementation, feature, operation, etc., may not necessarily refer to the same example, implementation, feature, operation, etc., and may mean at least one, one or more, etc.

Mobile communication networks may include one or more types and/or generations of wireless communication networks, such as 4th generation (4G) networks, 5th generation (5G) or new radio (NR) networks, etc. Such networks may include user equipment (UE) that wirelessly communicate with base stations. Such networks may also include, or be connected to, non-terrestrial networks (NTNs) so that terrestrial network devices (e.g., UEs, base stations, etc.) may communicate with one another via non-terrestrial devices (e.g., low earth orbit (LEO) satellites, medium earth orbit (MEO) satellites, geostationary earth orbit (GEO) satellites, etc.).

A satellite may operate transparently by relaying communications between UEs and base stations without demodulation or remodulation. Alternatively, a satellite may operate regeneratively by using on-board processing capabilities to, for example, demodulate uplink (UL) signals and remodulate downlink (DL) signals between UEs and base stations. Enabling UEs to connect to a wireless network via satellites may enhance network connectivity and reliability by increasing the quantity of access points (APs) that UEs may use to communicate with the network. This may also increase the collective coverage area of the network as the transmission capabilities of satellites (e.g., coverage area, footprint, etc.) may be greater than those of base stations. In some implementations, the satellite may be capable of operating as a base station or another type of access point (AP) of the network. As such, references herein to a base station, functions performed by a base station, etc., may also, or alternatively, be performed by a satellite in one or more implementations.

A cell identifier may identify a particular area (e.g., a cell) corresponding to geographic coordinates wherein a UE may obtain wireless service for communicating with a network. Multiple cell identifiers may be associated with a tracking area code (TAC) or tracking area identifier (TAI), which may represent a tracking area (TA) consisting of one or more cells. In networks where each cell is served by one base station, a cell (and corresponding base station) may be uniquely identified by a cell global identity (CGI). The CGI may include a combination of a mobile country code (MCC), mobile network code (MNC), tracking area code (TAC), and cell identifier (CI). The MCC may identify a country where the wireless communications network is located; the MNC may identify an owner or operator of the network; the TAC may identify a particular TA within the network, and the cell identity may identify a particular network cell.

A wireless communications network may perform paging operations for UEs. For example, when the network receives a message intended for a UE, an access and mobility management function (AMF) of the core network (CN) may determine that the UE is in an idle state and is not communicating with the network. The AMF may initiate a paging procedure that may include determining a TA associated with a last known location of the UE, and identifying base stations associated with the TA. The AMF may communicate a paging message or paging request to the base stations that may cause the base stations to transmit paging signals in the cells of the TA area. While in idle mode, the UE may periodically check for paging signals, and upon receiving a paging signal, exit idle mode and initiate a radio resource control (RRC) connection resume procedure to reconnect with the network, and receive the message that prompted the paging procedure.

Wireless communication networks that include NTNs (e.g., satellites), whereby UEs may connect to the network via a satellite, may implement cells as Earth-fixed cells or Earth-moving cells (sometimes referred to as satellite-moving cells). In Earth-fixed cell scenarios, a cell identity may be associated with geographic coordinates defining a cell, such that the coverage area of an NTN satellite may periodically overlap with fixed cells while orbiting the Earth. By contrast, in Earth-moving cell scenarios, a cell identity may be associated with a coverage area of a given satellite, such that the cell associated with the cell identity, moves with the satellite.

Current paging procedures in Earth-fixed cells and Earth-moving cells can be problematic, however, for reasons stemming from the mobility of satellites relative to how cells may be defined, the way satellites and cells are identified, and how the network may track UE location information. For example, in Earth-fixed cell scenarios, the network may not have a suitable way to track the ever-changing relationships between cells and satellites as cell identifiers in CGIs would be constantly updated. In Earth-moving cell scenarios, while cell identifiers may remain consistent as the cells move with satellites, the actual geographic coverage area associated with a cell identifier constantly changes, leaving the network without an effective or reliable way to identify an appropriate TA, and corresponding cell(s), for effective paging procedures.

Techniques described herein enable effective cell identification and paging in NTNs. As described herein, these techniques address both Earth-fixed and Earth-moving cell scenarios, by implementing logical cell identities and/or physical cell identities that enable the network to track satellite coverage areas to actual geographic coordinates corresponding network tracking areas. As described herein, a logical cell identity may refer to a cell that corresponds to a coverage area of a satellite (e.g., a logical cell), and a physical cell identity may refer to a cell in terms of actual geographic coordinates (e.g., a physical cell).

In scenarios involving Earth-fixed cells, as satellites orbit the Earth, a base station may monitor and map which satellites are able to provide service to which physical cells. For example, when a coverage area of a particular satellite comes within range of a physical cell, the base station may associate the logical cell identifier of the satellite with the physical cell identifier of the physical cell. The base station may also, or alternatively, create a logical cell global identity (LCGI) based on the CGI of the physical cell, such that the LCGI includes the MCC, MNC, and TAC of the CGI, and the logical cell identity of the satellite. Additionally, as the satellite continues along its orbital path, such that a coverage area of the satellite is no longer within range of the physical cell, the base station may disassociate the logical cell identifier of the satellite from the physical cell identifier of the physical cell. Further, if/when a new satellite comes within range the physical cell, the base station may associate the new satellite with the physical cell, thereby maintaining a record of which satellites are currently servicing which physical cells.

In scenarios involving Earth-moving cells, the base station may monitor movements of satellites, and the logical cell identifiers of satellites may be associated with physical cells based on moving coverage areas of each satellite. The base station may compare the geographic coordinates of the physical cells to those of tracking areas to determine which satellites are currently serving which TAs. As a result, the base station may create an LCGI for each satellite using the logical cell identifier of the satellite, the TA overlapping with the physical cell, and the MCC and MNC corresponding to the TA. Further, the base station may continue monitoring satellites and updating LCGIs to ensure accurate LCGIs are maintained as satellites travel orbitally. In this manner, the base station determine which satellites are currently providing service to which geographic areas (e.g., physical cells) and TAs of a network.

In scenarios involving either Earth-fixed or -moving cells, the core network may send a paging request to the base station. The base station may respond by identifying LCGIs that include a TA indicated in the paging request and identify the corresponding satellite(s) based on the logical cell identifiers in the LCGIs. The base station may cause the paging request to be sent to the identified satellites, such that the UE is paged, and resumes an active connection with the network. As such, by introducing logical cells and mapping logical cells to physical cells and TAs, the techniques described herein may enable a wireless communications network to effectively identify cells and perform paging procedures within an NTN.

As discussed in detail below, one or more of these techniques may be applied to implementations involving satellites traversing international borders. For example, satellites may use different logical cell identifiers depending on the location of the satellite relative to the geographic borders of a country. When a satellite (effectively) traverses an international border, the logical cell identifier for the satellite (in addition to a corresponding LCGI) may be updated with the appropriate logical cell identifier. The MCC and MNC may be updated as well. This may help ensure that satellites operationally shared by different countries may still function in a manner that is consistent with the preferences, requirements, standards, organization, etc., of the corresponding country. Furthermore, since logical cell identifiers and LCGIs, as presented herein, may be implemented by data structures (e.g., size, allocation, format, etc.) that are similar to those of physical cell identifiers and CGIs, respectively, the techniques described herein may be implemented with minimal modification, redesign, and reconfiguration of existing systems and networks.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)).

The systems and devices of example network 100 may operate in accordance with one or more communication standards, such as 2nd generation (2G), 3nd generation (3G), 4nd generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., base stations 122-1 and 122-2) that may be connected via non-ideal backhaul (NIB) (e.g., where one network node provides NR access and the other network node provides either E-UTRA for LTE or NR access for 5G).

In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 110, the IAB-MT may access the network using either one network node or using two different nodes with enhanced dual connectivity (EN-DC) architectures, new radio dual connectivity (NR-DC) architectures, or the like.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable the connections 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. RAN nodes 122 may be referred to herein, generically, as base stations 122. Additionally, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the network 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to an secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and intercell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers (as) 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application server 140 may also, or alternatively, be configured to support one or more communication services (e.g., voice over IP (VoIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160. Satellites 160 may be in communication with UEs 110 via service link or another wireless interface 162. Satellites 160 may also, or alternatively communicate with gateway 170 via feeder link or another wireless interfaces 164 (depicted individually as 164-1 and 164-2), and gateway 170 may communicate with RAN 120 via interface 172, which may include a high-speed fiber, IP network interface. Gateway 170 may include a ground station of a satellite system and may be configured to perform satellite network operations, including tracking orbital positions and trajectories of satellites 160, determining incidence angles of satellite signals relative to one or more geographic locations or coordinates (e.g., a physical cell), monitoring and/or determining geographic coverage ranges or areas of satellites 160, determine when satellites 160 come within, or out of, range of physical cells or tracking areas, and more.

In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2). Additionally, or alternatively, satellite 160 may include a GEO satellite, LEO satellite, MEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
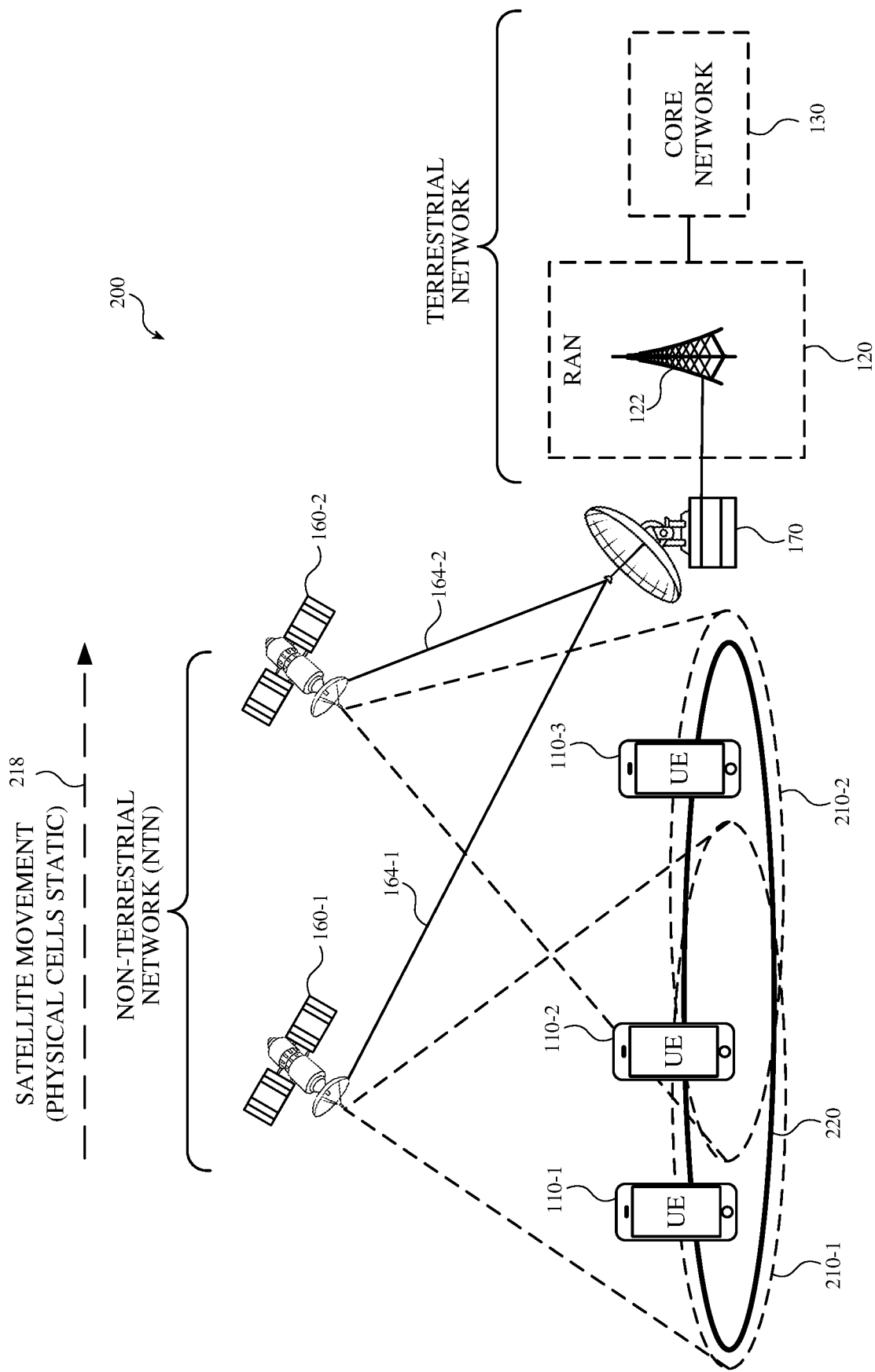
FIG. 2 is a diagram of an example network for cell identity and paging in an environment implementing Earth-fixed cells.

FIG. 2 is a diagram of an example network 200 for cell identity and paging in an environment implementing Earth-fixed cells. As shown, satellites 160-1 and 160-2 may have coverages areas 210-1 and 210-2 (referred to collectively as coverage areas 210, and individually as coverage area 210) and may move in accordance with direction 218. Coverage areas 210 may overlap with physical cell 220, and one or more UEs 110 may be located in coverage areas 210 and physical cell 220. Via wireless interfaces 164 involving gateway 170, satellites 160 may communicate with RAN 120, base station 122 and core network 130.

As described herein, base station 122 may maintain a mapping or record of satellites 160 serving physical cell 220. For example, as each satellite 160 moves within range of physical cell 220, gateway 170 may notify base station 122 regarding the satellite 160, and base station 122 may associate the satellite 160 with physical cell 220. For instance, base station 122 may associated a logical cell identifier of satellite 160 with a physical cell identifier of physical cell 220. Similarly, as each satellite 160 moves out of range of physical cell 220, gateway 170 may notify base station 122 regarding the satellite 160, and base station 122 may record the change in satellites 160 serving physical cell 220. As described in greater detail below, base station 122 may monitor which satellites 160 are serving physical cell 220 based on a CGI of physical cell 220 and/or LCGIs of satellites 160.

Depending on the implementations, the information communicated between gateway 170 and base station 122 may vary. For example, in some implementations, gateway 170 may notify base station 122 when each satellite 160 (and/or coverage area 210 of satellite 160) comes within range of physical cell 220 and/or when each satellite 160 (and/or coverage area 210 of satellite 160) is no longer within range of physical cell 220. In another example, gateway 170 may provide base station 122 with less information, such as a notification of an orbital location of satellite 160, a notification of satellite 160 coming within a threshold distance of gateway 170, etc.) and base station 122 may determine a remainder of information for accurately tracking satellite 160 relative to physical cell 220. For example, base station 122 may use satellite ephemeris information, and/or one or more other types of information available to base station 122, to determine an orbital location of satellite 160 at a given time, a coverage area 210 of satellite 160, an overlap between coverage area 210 and physical cell 220, whether a sufficient overlap between coverage area 210 and physical cell 220 exists such that satellite 160 may be considered a serving satellite 160 to UEs 110 of coverage area 210, etc.).

At some point, core network 130 may initiate a paging procedure directed to UE 110-1, 110-2, or 110-3. CN 130 may communicate a paging request to base station 122, indicating a TA (e.g., TAC, TAI, etc.) associated with physical cell 220. Base station 122 may determine which satellites 160 are currently serving TA and/or physical cell 220, based on the satellite-to-physical cell tracking described above, and may cause the serving satellites 160 to communicate a paging signal to UE 110. As such, by mapping logical cell identifiers of satellites 160 to cell identifiers of physical cells, base stations 122 may enable efficient and effective cell identification and paging within an NTN. Examples of these features and operations are described in detail below.

Figure 3:
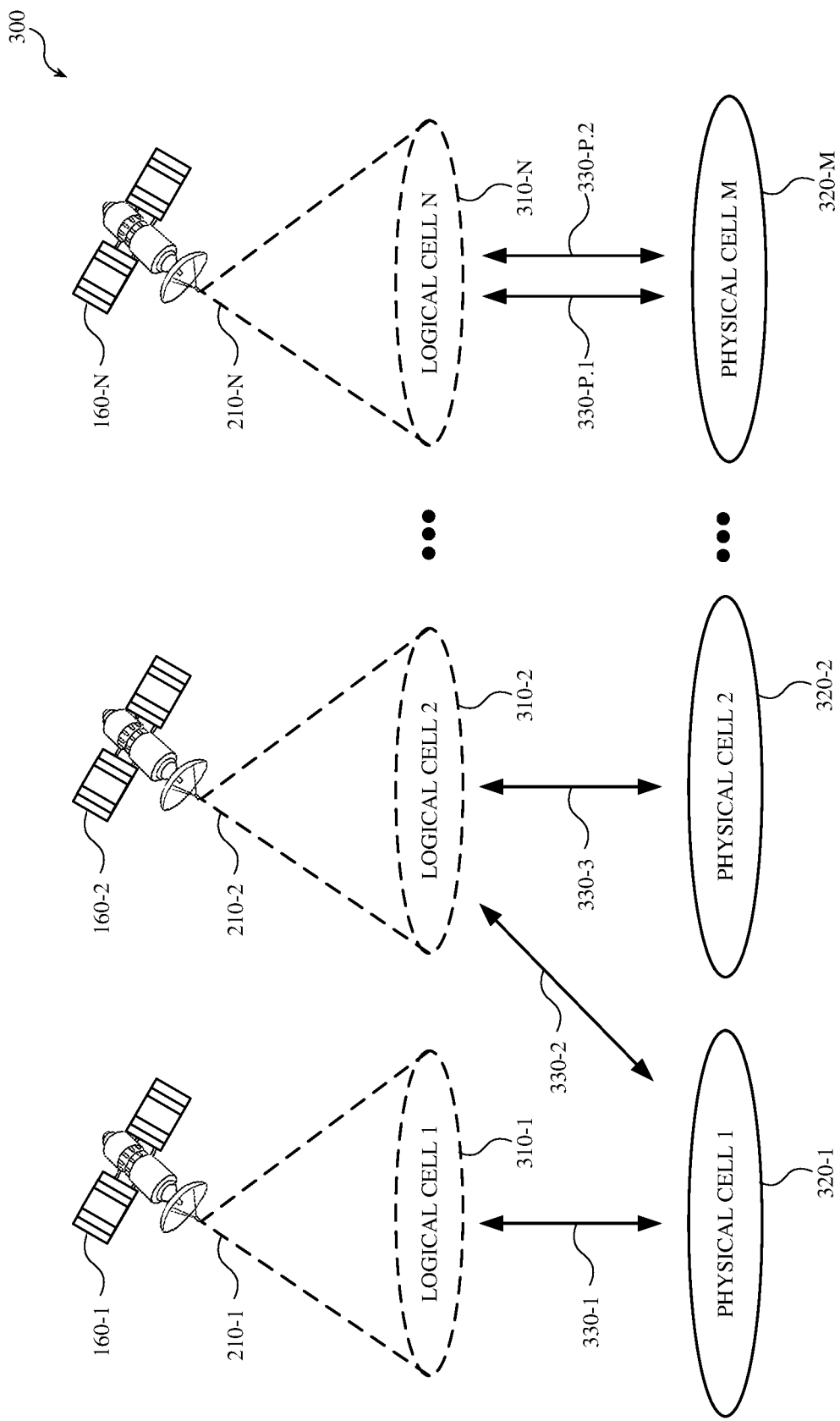
FIG. 3 is a diagram of an example of logical cells in relation to physical cells in an environment implementing Earth-fixed cells.

FIG. 3 is a diagram of an example 300 of logical cells in relation to physical cells in an environment implementing Earth-fixed cells. As shown, example 300 includes satellites 160, coverage areas 210, logical cells 310-1, 310-2, . . . 310-N (referred to collectively as logical cells 310 and individually as logical cell 310), and physical cells 320-1, 320-2, . . . 320-M (referred to collectively as physical cells 320 and individually as physical cell 320). Example 300 also includes relationship indicators 330-1, 330-2, 330-3, . . . 330-P.1 and 330-P.2, representing examples of associations that may exist between logical cells 310 and physical cells 320.

In some implementations, such as when a coverage area of satellite 160 overlaps with only one physical cell within a network, base station 122 may map a logical cell, such as logical cell 310-1, to one physical cell 320-1. In other implementations, such as when the coverage area of satellite 160 overlaps with multiple physical cells, base station 122 may map a logical cell, such as logical cell 320-2, to multiple physical cells 320-1 and 320-2. In yet other implementations, such as when a coverage area of satellite 160 overlaps with a physical cell traversing an international boundary, base station 122 may use multiple associations to map a logical cell to a physical cell, as represented by logical cell 310-N and physical cell 320-M. Additional examples of how logical cells 310 may be mapped to physical cells 320 are described below.

Figure 4:
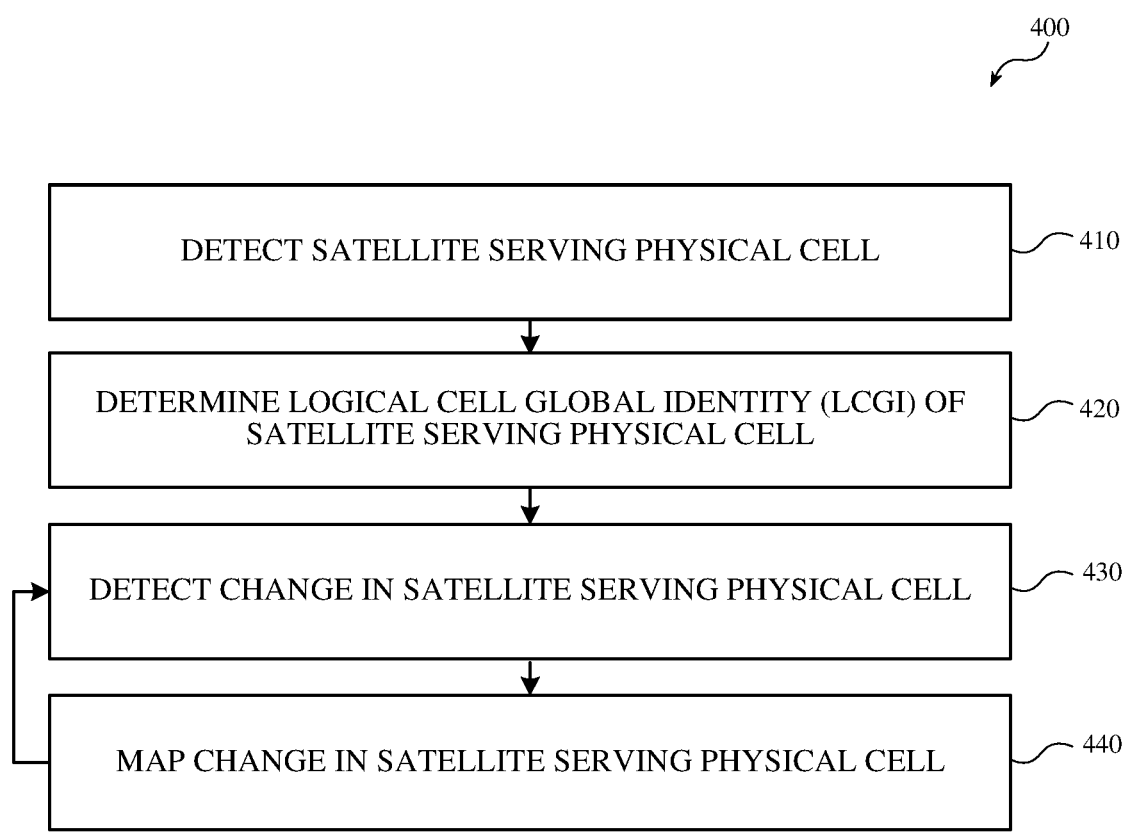
FIG. 4 is a flowchart of an example process for mapping satellites to physical cells.

FIG. 4 is a flowchart of an example process 400 for mapping satellites to physical cells. Process 400 may be implemented in an environment with Earth-fixed cells. Additionally, process 400 may be implemented by one or more base stations 122. In some implementations, some or all of process 400 may be performed by one or more other systems or devices, including one or more of the devices of FIG. 1. Additionally, process 400 may include one or more fewer, additional, differently ordered and/or arranged operations than those shown in FIG. 4. Furthermore, as example process 400 may be performed by base station 122, the scope of the techniques described herein include corresponding processes that may performed by other devices, including corresponding processes performed by other base stations, CN 130, satellite 160, gateway 170, and/or one or more other devices. Similarly, while process 400 may be described in reference to an environment with Earth-fixed cells, one or more operations or aspects of process 400 may also, or alternatively, be implemented in an environment with Earth-moving cells.

As shown, process 400 may include detecting a satellite serving a physical cell (block 410). For example, base station 122 may detect satellite 160 when satellite 160 comes within range of a physical cell. In some implementations, base station 122 may detect satellite 160 based on a notification from gateway 170. Additionally, or alternatively, base station 122 may detect satellite 160 based on satellite ephemeris information available to base station 122 and/or provided to base station 122 (which may be from gateway 170). As described herein, satellites 160 may be associated with a logical cell identifier that may correspond to the satellite directly and/or a coverage area or transmission footprint of the satellite. In some implementations, base station 122 may detect satellite 160 (for purposes described herein) when an acceptable or threshold amount of a coverage area of satellite 160 overlaps with the physical cell, which may be determined by base station 122, satellite 160, gateway 170, and/or another system or device of the network.

In some implementations, a notification of satellite 160 come within range of the physical cell, may include a logical cell identity associated with satellite 160. In some implementations, the notification may include other types of information (e.g., a satellite identifier other than the logical cell identity) and base station 122 may determine the logical cell identity based on the notification. As described herein, base station 122 may also detect satellite 160 moving out of range of the physical cell based on a similar process, operation, and/or information. For example, gateway 170 may notify base station 122 when satellite 160 moves out of range of the physical cell, base station 122 may autonomously determine (e.g., based, at least in part, on ephemeris information for satellite 160) when satellite 160 moves out of range of the physical cell, base station 122 may determine the logical cell identifier of a satellite moving out of range of the physical cell, etc.

Process 400 may include determining a LCGI of the satellite 160 serving the physical cell (block 420). For example, base station 122 may determine a logical cell identity associated with satellite 160 and determine a LCGI for satellite 160 using the logical cell identity. In some implementations, base station 122 may do so by determining a CGI of the physical cell and applying the CGI to the logical cell identity. For example, base station 122 may designated the MCC, MNC, and TAC of the LCGI based on the MCC, MNC, and TAC of the GCI of the physical cell. In some implementations, base station 122 may already have, or have access to, a previous LCGI determined for satellite 160 (e.g., an LCGI determined by another base station 122 of the network) and may update the previous LCGI appropriately. For example, the previous LCGI may already include a proper MCC, MNC, and logical cell identifier, and base station 122 may therefore determine the LCGI by updating the TAC of the previous LCGI. In some implementations, base station 122 may also, or alternatively, associated the LCGI with the GCI and/or physical cell identifier of the physical cell to, for example, help maintain a record of the satellites 160 serving the physical cell. As described herein, "associating", "creating an association", and similar phraseology, may refer to creating and storing a record, data structure, digital indication, and/or another type of logical or traceable relationship between designated entities.

Process 400 may include detecting a change in satellites 160 serving the physical cell (block 430). For example, base station 122 may detect when a satellite 160 exits (e.g., moves out of serving range of) the physical cell. Additionally, or alternatively, base station 122 may detect when a satellite 160 enters (e.g., moves within serving range of) the physical cell. In some implementations, base station 122 may detect the change based on communications from gateway 170. For instance, when a coverage area or transmission footprint of satellite 160 overlaps with the physical cell to a sufficient degree (e.g., according to a specified serving threshold), gateway 170 may send a message to base station 122, notifying base station 122 of the same. Similarly, when a coverage area or transmission footprint of satellite 160 no longer overlaps with the physical cell (e.g., according to a specified serving threshold), gateway 170 may send a message to base station 122, notifying base station 122 of the same.

As described herein, depending on the implementations, the amount of information and detail provided by gateway 170, and/or determined by base station 122, for detecting the change in serving satellites may vary. For example, the notification from gateway 170 may be relatively limited, such as satellite 160 arriving at a particular orbital location and/or satellite 160 having a threshold angle of incidence relative to the physical cell. In such scenarios, base station 122 may be configured to use the information to derive a remainder of information for performing the operations described herein (e.g., determining a logical cell identifier associated with satellite 160, an orbital location of satellite 160, a distance between the physical cell and an orbital location of satellite 160, a satellite coverage area of satellite 160, an overlap between the coverage area and the physical cell area, a precise moment in which satellite 160 is no longer serving the physical cell, etc.). Alternatively, gateway 170 may provide base station 122 with a relatively complete data set (e.g., the logical cell identifier, a real-time indication of whether satellite 160 is serving the physical cell, etc.) such that detecting the change in satellites serving the physical cell may be relatively simple operation for base station 122.

Process 400 may include mapping the change in satellites 160 serving the physical cell. (block 440). For example, base station 122 may maintain a record of satellites 160 currently serving one or more physical cells. In some implementations, in response to base station 122 detecting a change in a satellite 160 serving a particular physical cell, base station 122 may map, record, create a record of, etc., the change in satellites 160. In doing so, base station 122 may maintain an accurate record of which satellites 160 (if any) are currently serving the physical cell. Base station 122 may determine the logical cell identifier of the satellite 160 entering (or leaving) the physical cell and create a record (or update an existing record) to properly associate the logical cell identifier (e.g., via a LCGI) corresponding to the physical cell identifier (e.g., via a CGI). Additionally, example process 400 may continue by detecting another change in satellites (block 430) serving the physical cell, mapping the changes (block 440), and so on. As such, the techniques described herein may enable base station 122 to maintain an accurate record of which satellites 160 are serving which physical cells at any given time.

Figure 5:
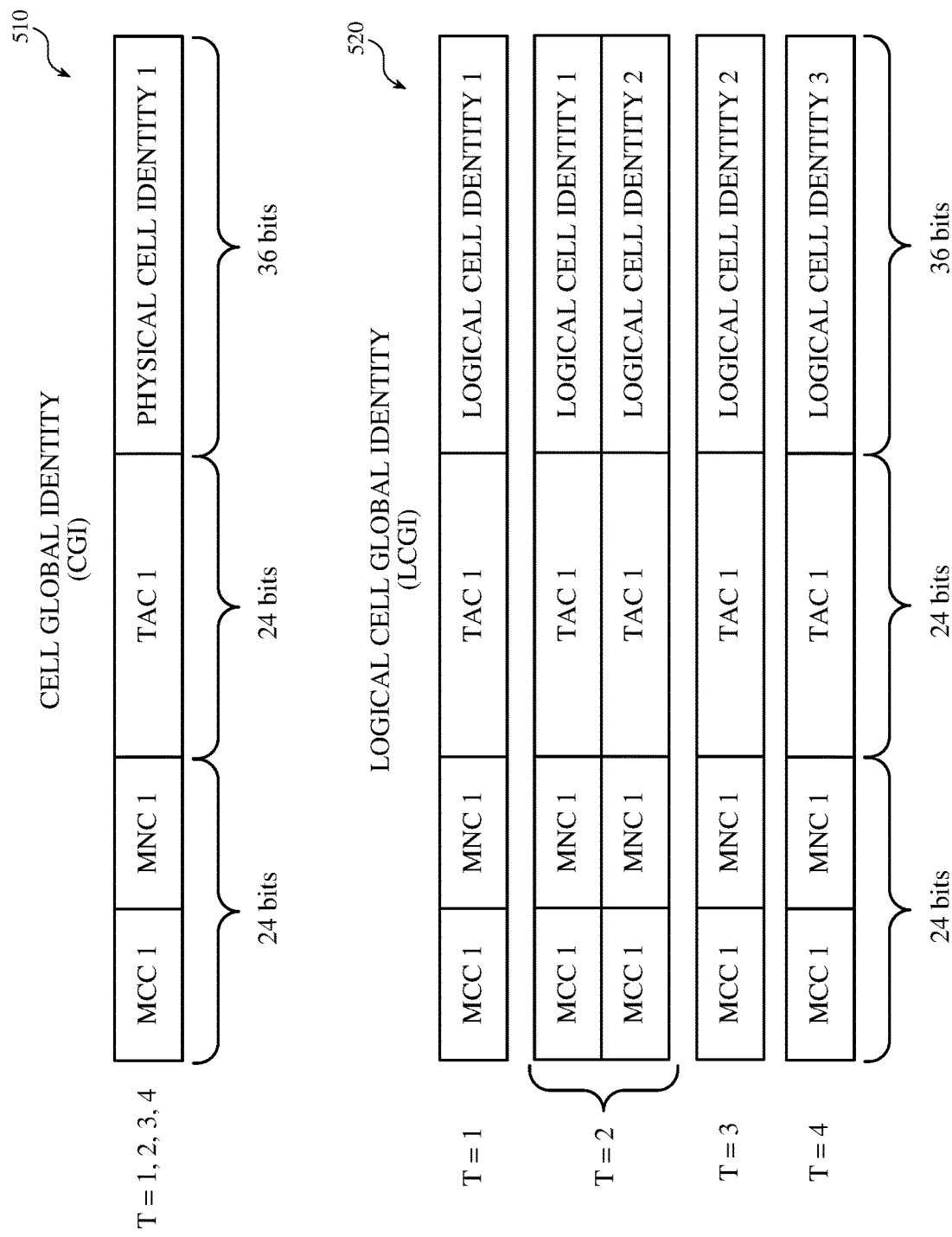
FIG. 5 is a diagram of example data structures for associating a global cell identity (CGI) of a physical cell with logical CGIs (LCGIs) of satellites over time.

FIG. 5 is a diagram of example data structures 510 and 520 for associating a CGI of a physical cell with LCGIs of satellites over time. Example data structures 510 and 520 may correspond to an Earth-fixed cell environment. As shown, data structures 510 and 520 may each include an MCC, MNC, AND TAC ID (or TAC). The CGI may include the same physical cell identity (PHYSICAL CELL IDENTITY 1) over time (T=1, 2, 3, and 4). The LCGIs may each include a logical cell identity, which may be associated with different satellites 160 and/or a transmission coverage area or footprint of satellites 160. As shown, at T=1, a satellite (identified by LOGICAL CELL IDENTITY 1) may come within range of the geographic coordinates associated with the physical cell of the CGI. As such, base station 122 may associate the CGI with a LCGI that includes the same MCC, MNC, and TAC ID as the CGI, but includes the logical cell identifier (LOGICAL CELL IDENTITY 1) of the satellite currently serving the physical cell.

At T=2, another satellite (identified by LOGICAL CELL IDENTITY 2) may come within range of the physical cell, and base station 122 may associate the CGI of the physical cell with the another LCGI that includes the same MCC, MNC, and TAC as the CGI, but also includes the logical cell identifier of the new satellite (LOGICAL CELL IDENTITY 2). Since the previous satellite may still within range of the physical cell, the physical cell may remain associated with both satellites. At T=3, the satellite associated with LOGICAL CELL IDENTITY 1 may move out of range of the physical cell, and base station 122 may remove or delete the corresponding LCGI. Later, at T=4, the satellite of LOGICAL CELL IDENTITY 2 may move out of range of the physical cell, and a new satellite (identified by LOGICAL CELL IDENTITY 3) may move within range of the physical cell, and base station 122 may update the LCGIs associated with the CGI to reflect this.

As such, base station 122 may maintain an accurate mapping between a physical cell and the satellites 160 providing service to the physical cell. Furthermore, each data structure 510 and 520 may implement a uniform format and bit allocation (e.g., 24 bits for the MCC and MNC, 24 bits for the TAC, and 36 bits for the physical cell identifier or logical cell identifier) thereby enabling the techniques described herein to provide a solution to cell identification and paging within NTNs with minimal modification, redesign, and reconfiguration of existing systems and networks.

Figure 6:
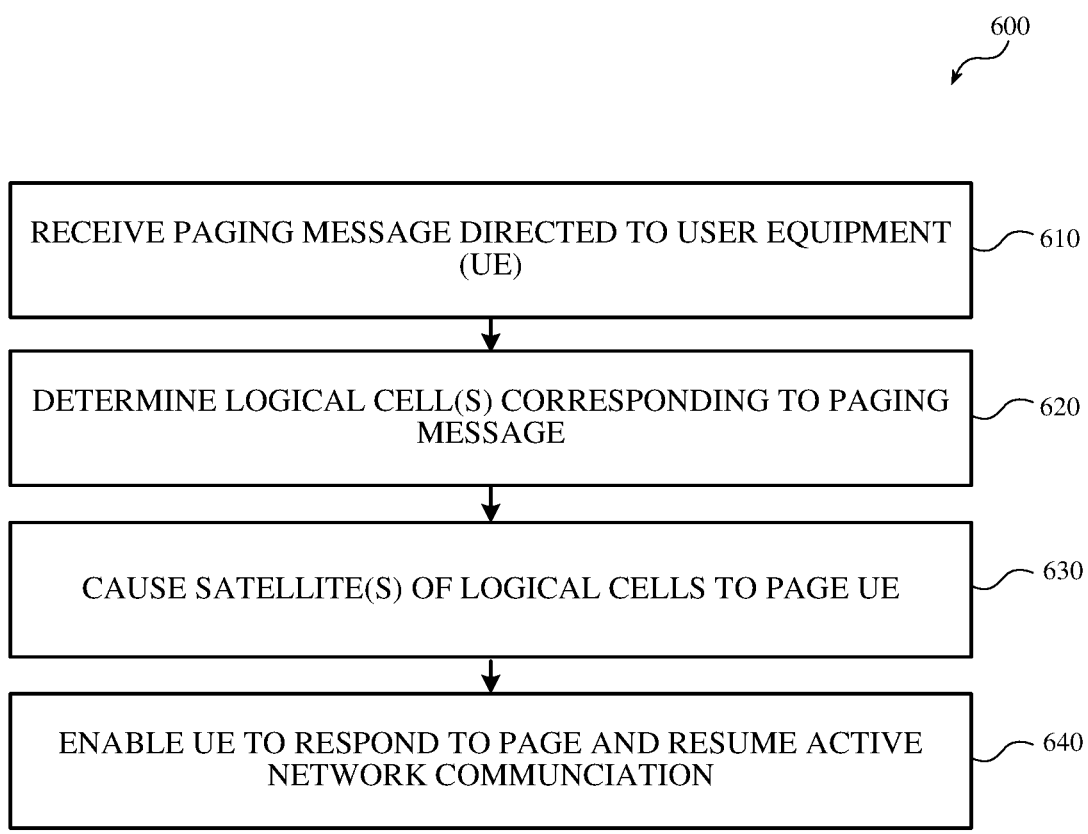
FIG. 6 is a flowchart of an example process for paging user equipment (UE) based on a LCGI.

FIG. 6 is a flowchart of an example process 600 for paging UE 110 based on a LCGI. Process 400 may be implemented in an environment with Earth-fixed cells and/or Earth-moving cells. Process 600 may be implemented by one or more base stations 122. In some implementations, some or all of process 600 may be performed by one or more other systems or devices, including one or more of the devices of FIG. 1. Additionally, process 600 may include one or more fewer, additional, differently ordered and/or arranged operations than those shown in FIG. 6. Furthermore, as example process 600 may be performed by one or more base stations 122, the scope of the techniques described herein include corresponding processes that may performed by other base stations, core network 130, satellite 160, gateway 170, and/or one or more other devices.

As shown, process 600 may include receiving a paging message directed to UE 110 (block 610). For example, base station 122 may receive a request from core network 130 (e.g., an AMF of core network 130) to page a particular UE 110. The message may include location information associated with UE 110, such as a cell, base station, coverage area, or TA (e.g., a TAC, TAI, etc.). The location information received by base station 122 may be based on a location where UE 110 was most recently located (e.g., prior to discontinuing active communications with the network, entering idle mode, etc.).

Process 600 may include determining logical cells corresponding to the page message (block 620). For example, base station 122 may use the location information included in, or provided in combination with, the paging message to determine logical cells for the paging message. In some embodiments, the paging message may include a TAC, TAI, etc., and base station 122 may use the TAC to query a registry or repository of LCGIs to identify one or more LCGIs that include the TAC. As described herein, the LCGIs may include logical cell identifiers associated with satellites 160 currently serving physical cells of the TA indicated in the paging message. Base station 122 may identify the particular serving satellites 160 based on the logical cell identifiers of each LCGI.

Process 600 may include causing satellites 160 of the logical cells to page UE 110 (block 630). For instance, base station 122 may communicate, to satellites 160 of the identified logical cells, a request for the satellites 160 to page UE 110. Base station 122 may do so by communicating a paging request to gateway 170, such that gateway 170 transmits the paging request to the identified satellites 160. In response, the satellites 160 receiving the request may transit paging signals directed toward UE 110.

Process 600 may include enabling UE 110 to respond to the page and resume active network communication (block 640). For example, in response to receiving a page from satellite 160, UE 110 may communicate with base station 122 to reconnect or reactivate a connection with the core network 130. In some implementations, this may be part of an RRC connection resume procedure initiated by UE 110. Base station 122 may respond accordingly, and thereby enable UE 110 to resume active communications with the network. In this manner, the techniques described herein may enable efficient and effective paging of UEs 110 in NTNs by using logical cell identifiers to map which satellites 160 are currently serving which physical cells and/or TAs within the wireless communication network.

Figure 7:
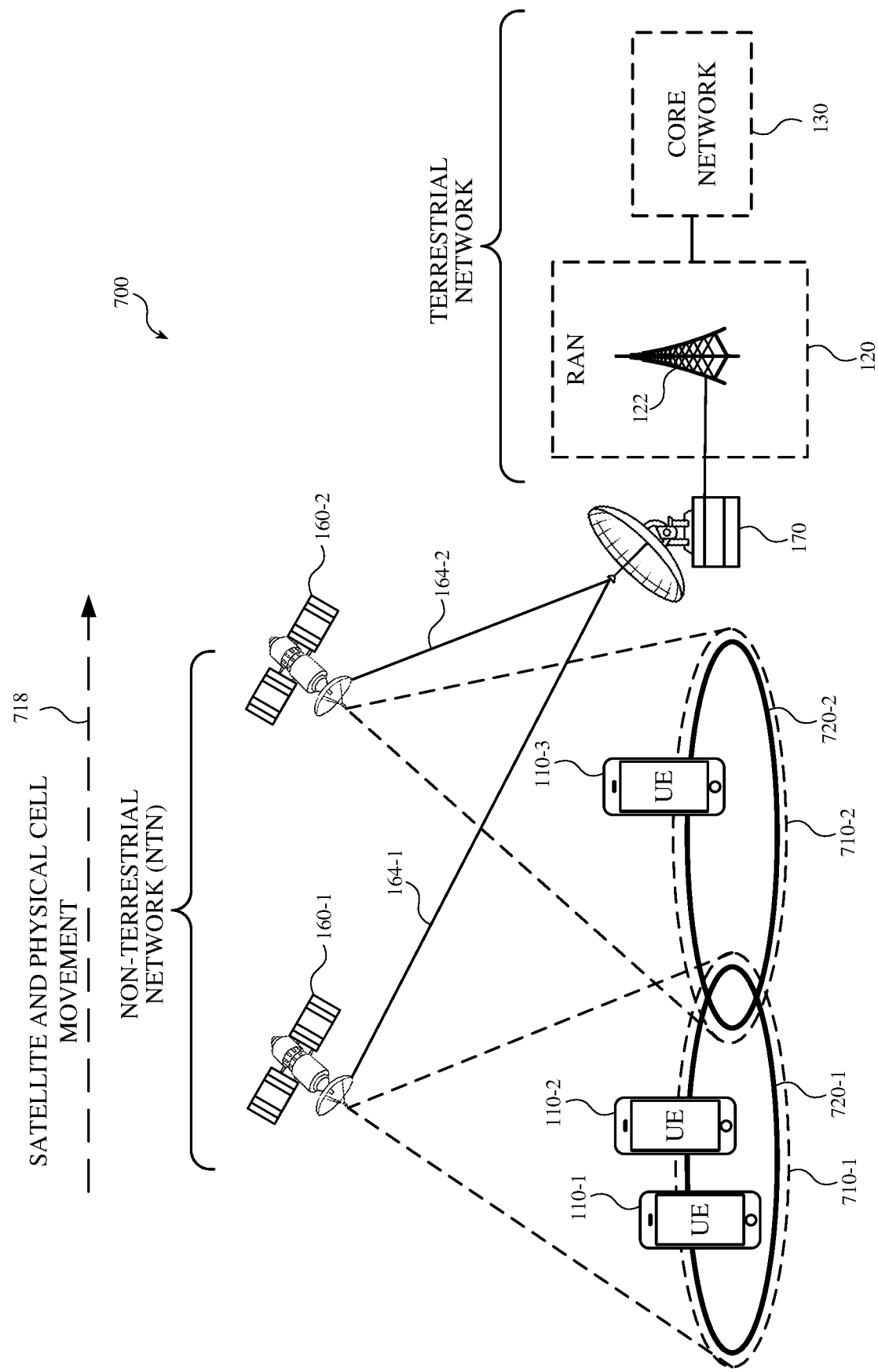
FIG. 7 is a diagram of an example network for cell identity and paging in an environment implementing Earth-moving cells.

FIG. 7 is a diagram of an example network 700 for cell identity and paging in an environment implementing Earth-moving cells. As described herein, a network environment involving Earth-moving cells may include an architecture in which physical cells move in accordance with satellites 160. For example, satellites 160-1 and 160-2 may each include coverage areas 710-1 and 710-2, which may be based on a capacity, and/or configuration, of each satellite 160 to send and receive wireless signals to UEs 110. The network may identify physical cells 720-1 and 720-2 based on the coverage areas 710-1 and 710-2 of each satellite 160. As such, the physical cells 720 by which UEs 110 may communicate with the network (e.g., RAN 120, base station 122, and core network 130) may move in accordance with orbital movements 718 of corresponding satellites 160. In an Earth-moving cells environment, therefore, which satellite 160 operates as a serving satellite for a particular UE 110 (e.g., a UE 110 not moving in accordance with the moving physical cell of the satellite) may change.

According to techniques described herein, a logical cell identifier may be associated with each satellite 160 (and/or a coverage area 710) and base station 122 may communicate with gateway 170 to map and maintain an updated record of the physical cells 720 of each satellite 160. For example, gateway 170 may update base station 122 regarding positions, movements, coverage areas, etc., of satellites 160. In some implementations, gateway 170 may provide base station 122 with updates regarding satellites 160 based on one or more conditions, such as satellites 160 within a threshold distance (e.g., of base station 122 and/or gateway 170), with a threshold angle of incidence relative to a specified location, etc. In some implementations, base station 122 may autonomously determine some, or all, of such information based on, for example, ephemeris information of satellites 160.

Additionally, or alternatively, base station 122 may determine geographic parameters of physical cells 720 based on, for example, ephemeris information, signal capacity, signal range, etc., of satellites 160. Base station 122 may determine whether physical cells 720 overlap with one or more TAs of the network. For example, base station 122 may compare geographic parameters of a current physical cell 720 of satellite 160 to geographic parameters corresponding to network TAs to determine whether the physical cell 720 overlaps with one or more TAs. Upon identifying an overlap (or an overlap exceeding a specified overlap threshold), base station 122 may map, or associate, a logical cell identifier, of the corresponding satellite 160, to a physical cell identifier designated for identifying the physical cell 720, which may, in turn, be mapped to the corresponding TA. In some implementations, base station 122 may map the logical cell identifier of satellite 160 directly to the TA (e.g., without reference to a physical cell identifier) via a LCGI that includes the logical cell identifier of satellite 160 and the TAC of the overlapping TA. The LCGI may also include an appropriate MCC and MNC.

In doing so, base station 122 may create a record associating Earth-moving, physical cells to TAs of the network, such that the network may effectively page UEs 110 based on satellites 160 currently servicing network TAs. For example, upon receiving a paging request from core network 130, base station 122 may obtain the TAC identified in the paging request and may map the TAC to LCGIs that include the TAC. Based on the identified LCGIs, base station 122 may identify the satellites 160 serving the TA of the TAC based on the logical cell identities of the LCGIs. In turn, base station 122 may cause the paging request to be communicated to satellites 160 of the logical cell identities in performance of the paging procedure initiated by core network 130. Additional examples of these operations are described below with reference to the figures that follow.

Figure 8:
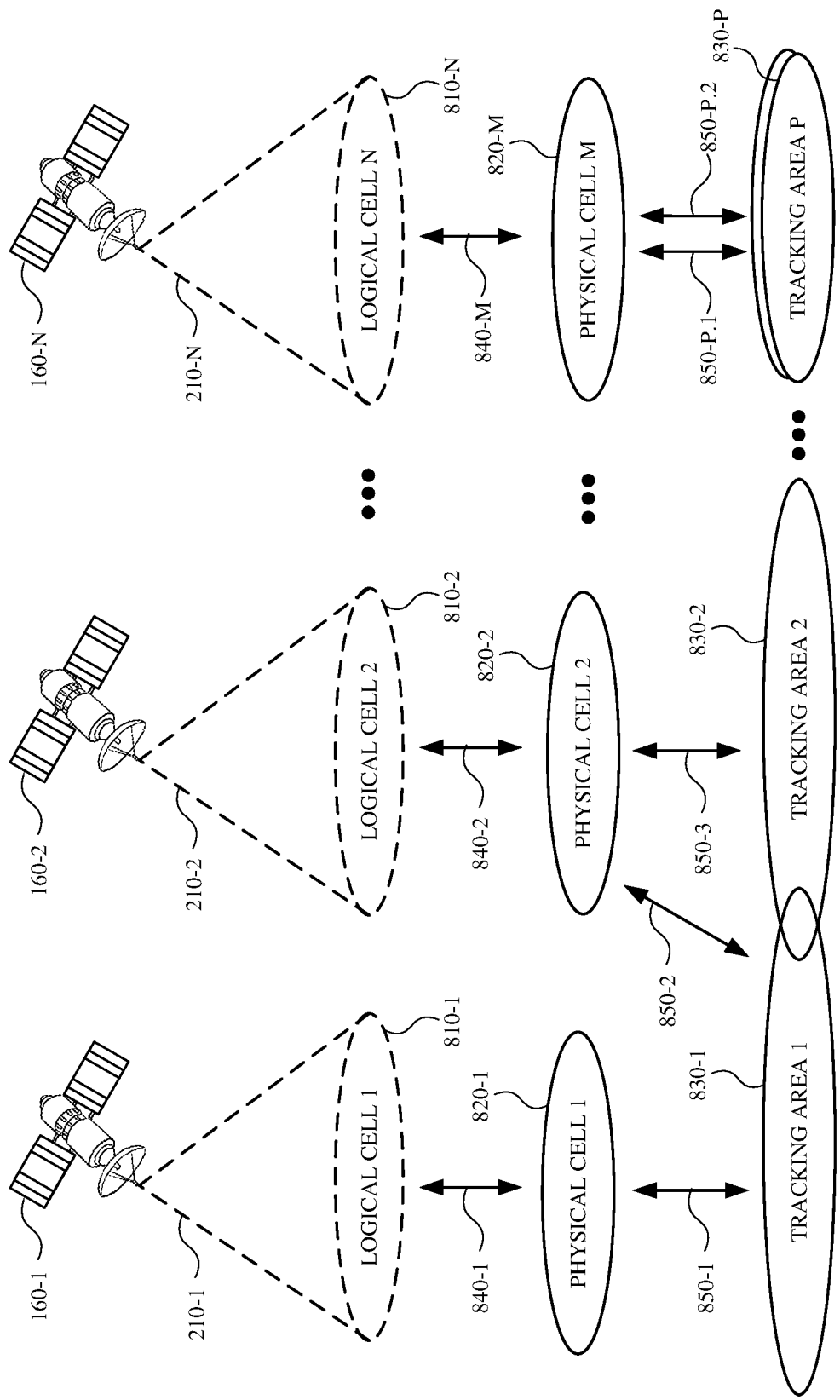
FIG. 8 is a diagram of an example of logical cells in relation to physical cells and tracking areas in an environment implementing Earth-moving cells.

FIG. 8 is a diagram of an example 800 of logical cells in relation to physical cells and TAs in an environment implementing Earth-moving cells. As shown, example, 800 includes satellites 160-1, 160-2, . . . 160-N, coverage areas 210-1, 210-2, . . . 210-N, logical cells 810-1, 810-2, . . . 810-N, physical cells 820-1, 820-2, . . . 820-M, and tracking areas 830-1, 830-2, . . . 830-P. Example 800 also includes relationship indicators 840-1, 840-2, . . . 840-M, illustrating examples of how logical cells 810 may relate to physical cells 820 in the network, and relationship indicators 850-1, 850-2, 850-3, . . . 850-P.1 and 850-P.2, illustrating examples of how physical cells 820 may relate to tracking areas 830 in the network.

In one example, base station 122 may associate logical cell 820-1, corresponding to coverage area 210-1 of satellite 160-1, with one physical cell 820-1. The geographic coordinates of physical cell 820-1 may be determined by base station 122 and/or provided to base station 122 by gateway 170. Base station 122 may compare physical cell 820-1 to TAs of the network and may determine that physical cell 820-1 overlaps with one TA 830-1. As such, base station 122 may create a record (e.g., an ICGI) that associates satellite 160-1 with TA 830-1. In another example, base station 122 may associate logical cell 820-2, corresponding to coverage area 210-2 of satellite 160-2, with one physical cell 820-2, and may determine that the physical cell 820-2 overlaps with multiple TAs 830-1 and 830-2. As such, base station 122 may create a record (e.g., an ICGI) that associates satellite 160-2 with TA 830-1 and 830-1. In some implementations, base station 122 may do so by creating two ICGIs; one ICGI that associates the logical cell identifier of satellite 160-2 to the TAC of TA 830-1, and another ICGI that associates the logical cell identifier of satellite 160-2 to the TAC of TA 830-2. In another example, such as when coverage area 210-3 of satellite 160-3 overlaps an international boundary, base station 122 may associate logical cell 820-3, corresponding to coverage area 210-3, with one physical cell 820-3, and may determine that the physical cell 820-3 overlaps with TAs 830-P corresponding to different countries. As such, base station 122 may create a record (e.g., ICGI) that associates satellite 160-3 with TA 830-P of one country (represented by 850-P.1), and create another record (e.g., another ICGI) that associates satellite 160-3 with TA 830-P the other country (represented by 850-P.2). As such, the techniques described herein may include one or more ways in which base station 122 may map and properly associate satellites 160, logical cells 810, physical cells 820, and TAs 830.

Figure 9:
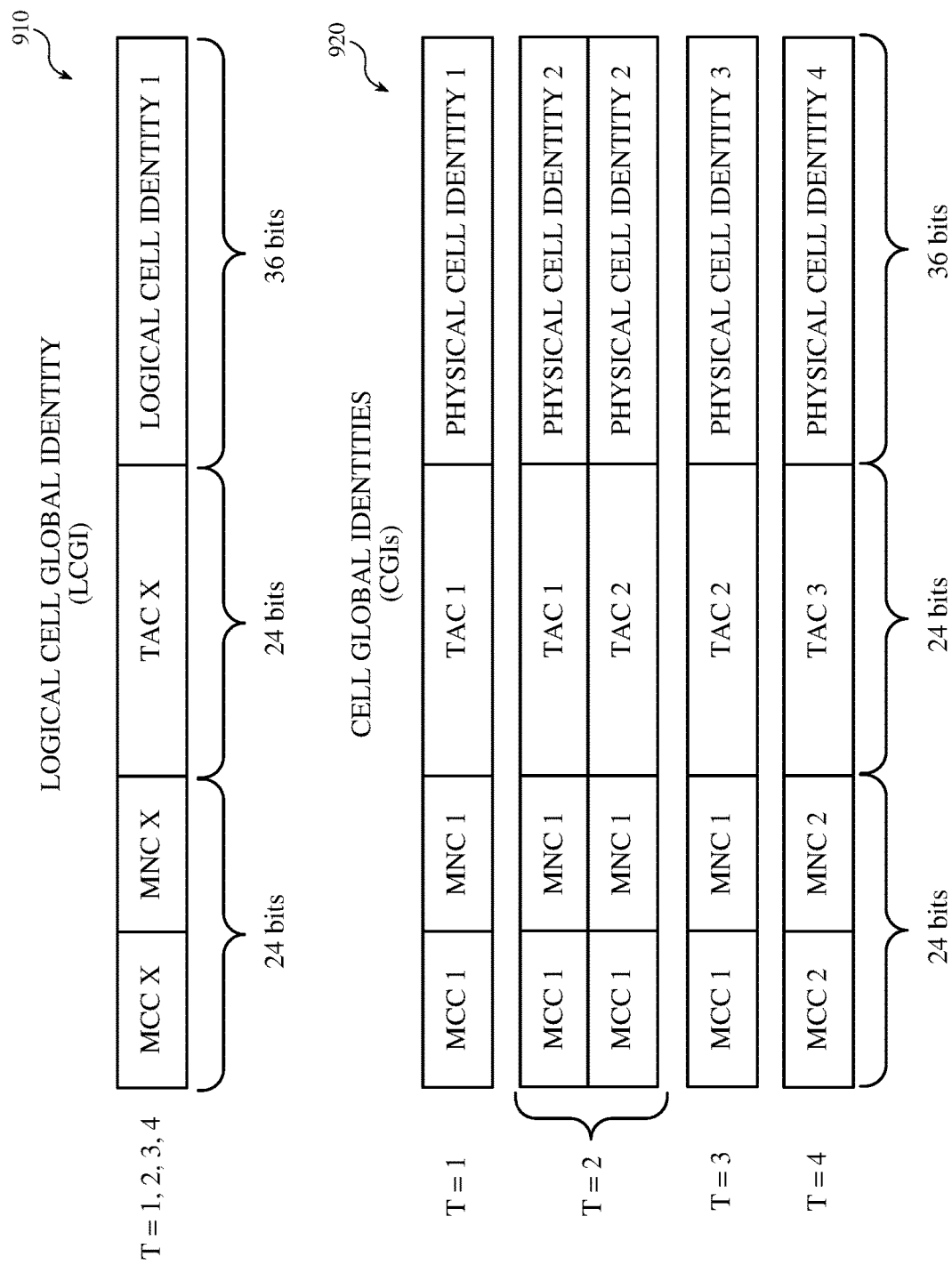
FIG. 9 is a diagram of example data structures for associating a LCGI of a satellite with CGIs over time.

FIG. 9 is a diagram of example data structures 910 and 920 for associating a LCGI of a satellite with CGIs over time. Example data structures 910 and 920 may correspond to an Earth-moving cell environment As shown, data structure 910 includes a LCGI of satellite 160 at times, T=1, 2, 3, and 4, and data structures 920 include CGIs that may be associated with the LCGI at corresponding times, T=1, 2, 3, and 4. In some embodiments, data structures 910 and 920 may be an example the manner in which base station 122 may use logical cell identities to identify satellites 160 within an Earth-moving cell network environment.

As shown, data structure 910 may include a LCGI that includes a MCC, MNC, TAC, and logical cell identity. The logical cell identity (LOGICAL CELL IDENTITY 1) may identify a particular satellite 160 of an NTN. As satellite 160 moves according to its orbital trajectory, the MCC, MNC, and TAC of the LCGI may be updated according to the country, network, and TA corresponding to the physical cell (or geographic coverage area) of satellite 160. As such, since the values for the MCC, MNC, and TAC of the LCGI may change, the values for the MCC, MNC, and TAC of the LCGI in FIG. 9 are represented with the value "X". In other implementations, one or more of the MCC, MNC, and TAC may not change, or may only change in selected circumstances, such as per a preference, requirement, security protocol, standard, etc., of a particular country, network, and/or tracking area.

Data structures 920 may include examples of CGIs that may correspond to a physical cell of satellite 160 at times, T=1, 2, 3, and 4. The physical cell identity may include an identifier for geographic parameters that represent a current coverage area of satellite 160, while the TAC may identify a TA corresponding to the physical cell. The MCC and MNC may likewise correspond to the country and network associated with the current physical cell of satellite 160.

At T=1, base station 122 may determine a physical cell (PHYSICAL CELL IDENTITY 1) based on the geographic coverage area of satellite 160. As described herein, base station 122 may determine a TA (indicated by TAC 1) corresponding to the physical cell in addition to a MCC (MCC 1) and MNC (MNC 1). Based on satellite movement, at T=2, the geographic coverage area (or physical cell) of satellite 160 may overlap with two tracking areas, which base station 122 may record by associating the ICGI of satellite 160 with CGIs indicating the same (updated) geographic coverage area (PHYSICAL CELL IDENTITY 2) but different tracking areas (TAC 1 and 2). Later, at T=3, satellite 160 and corresponding geographic coverage area, may move out of one of the TAs (TAC 1) but still be in, or overlapping with, the other tracking area (TAC 2), and base station 122 may update the CGIs associated with the ICGI for satellite 160 to indicate this change, along with an update regarding the new geographic coverage area (PHYSICAL CELL IDENTITY 3). At T=4, when satellite 160 moves into another country, base station 122 may update the CGIs, associated with the ICGI for satellite 160, to indicate the new country (MCC 2), a new network operator (MNC 2), and a new TA (TAC 3) associated with the new geographic coverage area (PHYSICAL CELL IDENTITY 4) of satellite 160.

As such, base station 122 may maintain an accurate mapping between physical cells of satellites 160, in an Earth-moving cells implementation, by mapping the logical cell identity (which may be part of the LCGI) of satellite 160, to the changing geographic coverage areas served by satellite 160, and mapping the changing coverage areas to TAs recognized by the network. Additionally, upon receiving a paging request from core network 130, base station 122 may identify which satellites 160 are currently serving the TA identified in the paging request by referencing CGIs and/or ICGIs maintained for satellites 160. Furthermore, each data structure 910 and 920 may implement a uniform format and bit allocation (e.g., 24 bits for the MCC and MNC, 24 bits for a TAC, and 36 bits for a physical cell identifier or a logical cell identifier) thereby enabling the techniques described herein (e.g., the introduction, mapping, and use of logical cell identifiers and LCGIs) to provide solutions for cell identification and paging that involve minimal modification, redesign, and reconfiguration of existing systems and networks.

Figure 10:
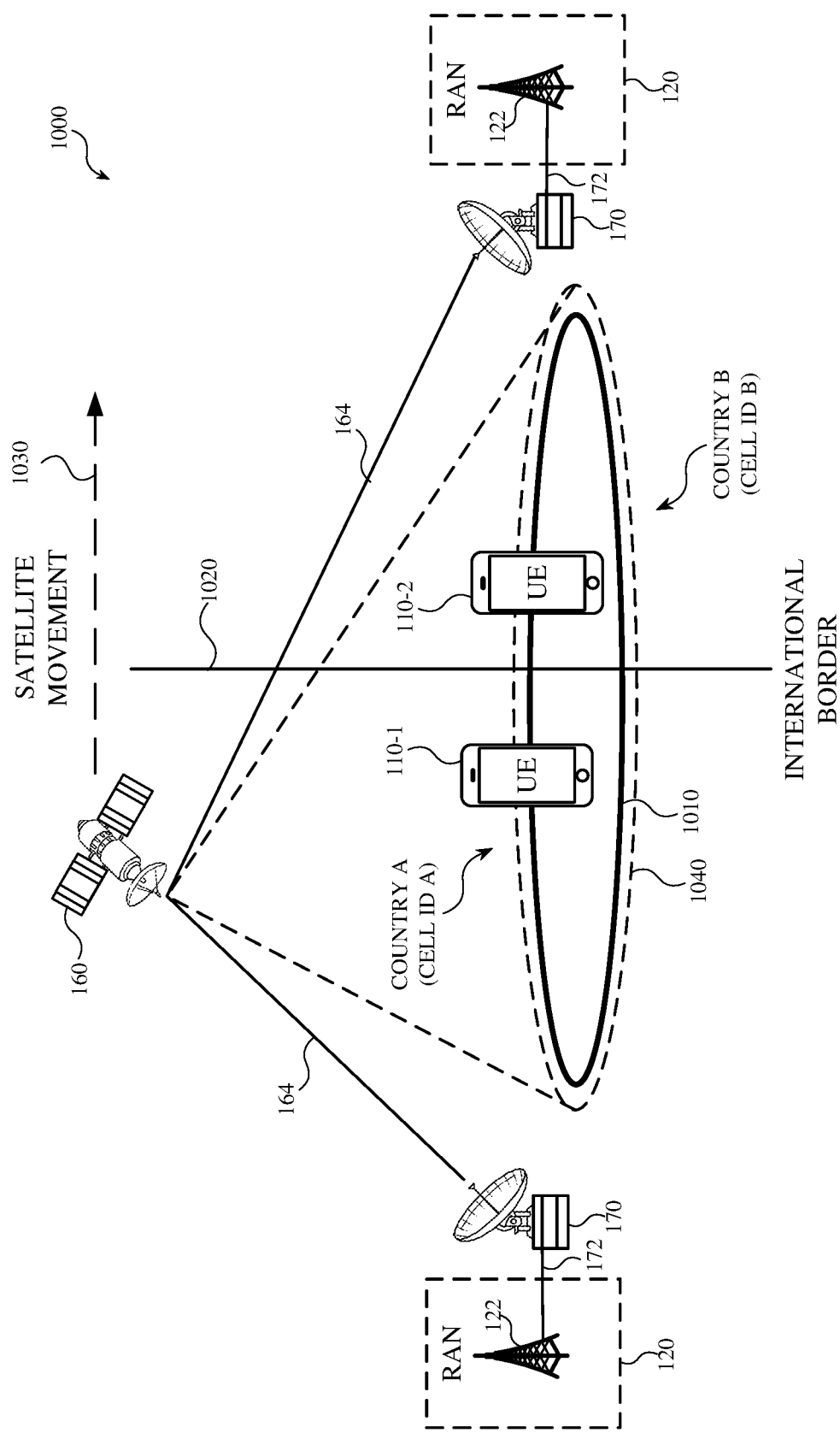
FIG. 10 is a diagram of an example for cell identification and paging across an international border.

FIG. 10 is a diagram of an example 1000 for cell identification and paging across an international border. As shown, physical cell 1010 may traverse an international border 1020, between country A and country B. At one point in time, satellite 160 may provide service to UEs 110 of physical cell 1010 while in country A. Later, after traveling in direction 1030, satellite 160 may provide service to UEs 110 of physical cell 1010 while in country B. Further, each country may have RANs 120, base stations 122, and gateways 170 communicating with satellite 160. The physical cell identities for countries A and B are cell identity (ID) A and cell ID B, respectively.

In some implementations, satellite 160 may have the same logical cell identifier, regardless of whether satellite 160 is located in country A or B. In such implementations, base stations 122 of each country may map satellite 160 to physical cell 1010, as described herein, using ICGIs with the same logical cell identifier. In some examples, base stations 122 of each country may map satellite 160 using MCCs, MNCs, and TACs specific to each country. In other examples, base stations 122 of each country may map satellite 160 using the same MCCs, MNCs, and TACs.

In other implementations, the logical cell identifier used to identify satellite 160 may change based on whether satellite 160 is located in country A or B. For example, while satellite 160 is in country A, base stations 122 of each country may map satellite 160 to physical cell 1010 using a logical cell identifier designated for satellite 160 being in country A. However, when satellite 160 moves into country B, base stations 122 of each country may map satellite 160 to physical cell 1010 using a logical cell identifier designated for satellite 160 being in country B. In such a scenario, the MCC, MNC, and TAC used by base stations 122 of country A and B may be country-specific.

Figure 11:
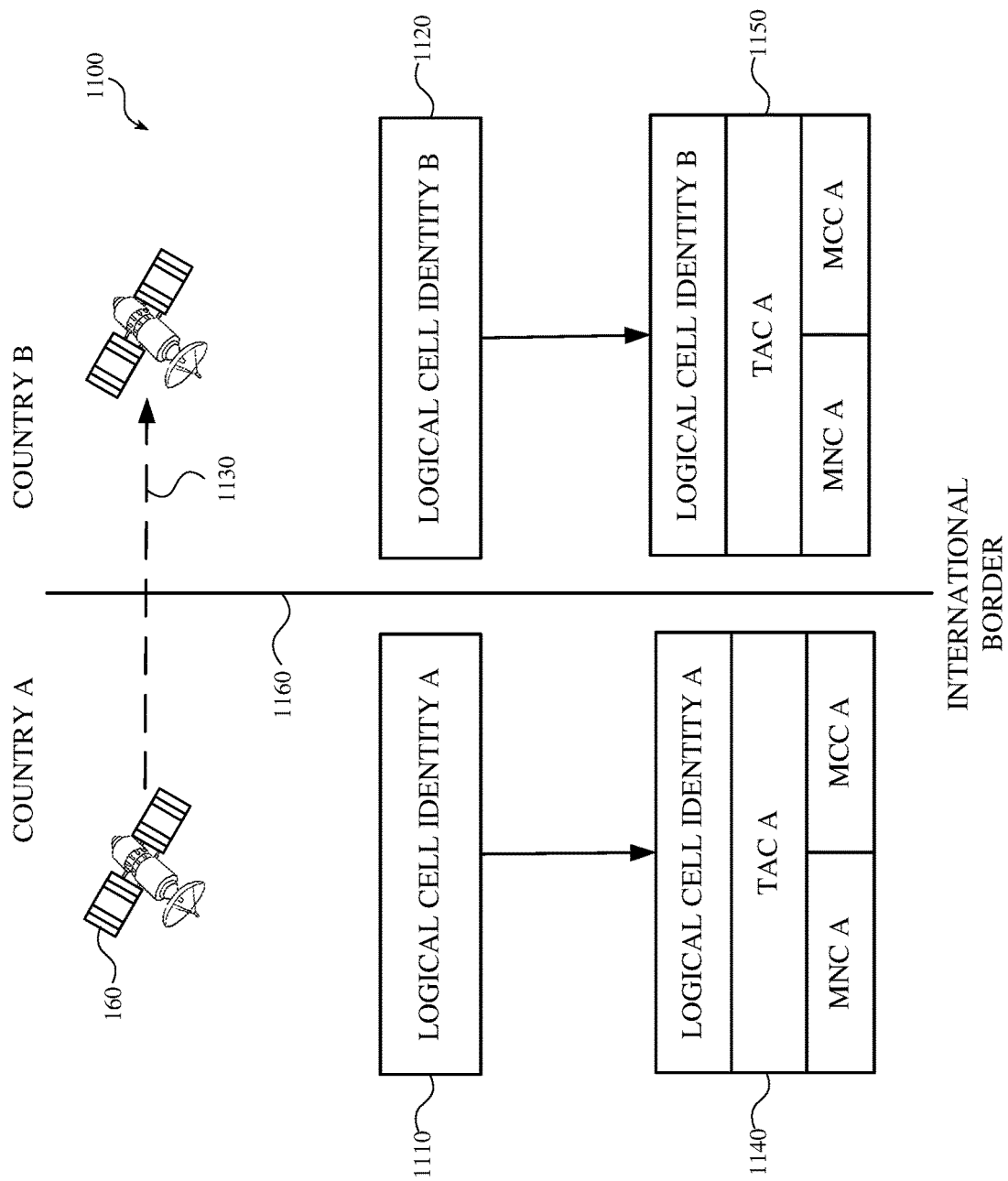
FIG. 11 is a diagram of an example data structures for mapping a logical cell of a satellite across an international border.

FIG. 11 is a diagram of an example data structures 1100 for mapping a logical cell of a satellite across an international border. FIG. 11 provides an example of how a base station of country A may map a satellite traveling from country A to country B. As shown, one logical cell identifier 1110 may be applicable when satellite 160 is in country A, and another logical cell identifier 1120 may be applicable when satellite 160 is located in country B. More particularly, while satellite 160 is in country A, a base station 122 of country A may track and map satellite 160 using an IGCI 1140 that includes the logical cell identity A 1110, and an MNC, MCC, and TAC for country A as well. When satellite 160 crosses international border 1160 and enters country B, the base station of country A may track and map satellite 160 using an IGCI 1150 that includes the logical cell identity B 1120, and an MNC, MCC, and TAC for country A.

An inverse of the example of FIG. 11 may represent how a base station 122 of country B may map the satellite 160 while traveling from country A to country B. Additionally, using the same MNC, MCC, and/or TAC for each country may enable base station 122 of country A to identify satellite 160 as a serving satellite for paging purposes (since a paging request from a core network 130 of country A may indicate a TAC for country A). Additionally, or alternatively, using logical cell identity B 1120 while satellite is located in country B may enable base station 122 of country A determine that a satellite located in another country is being used to communicate with UE 110.

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

Figure 12:
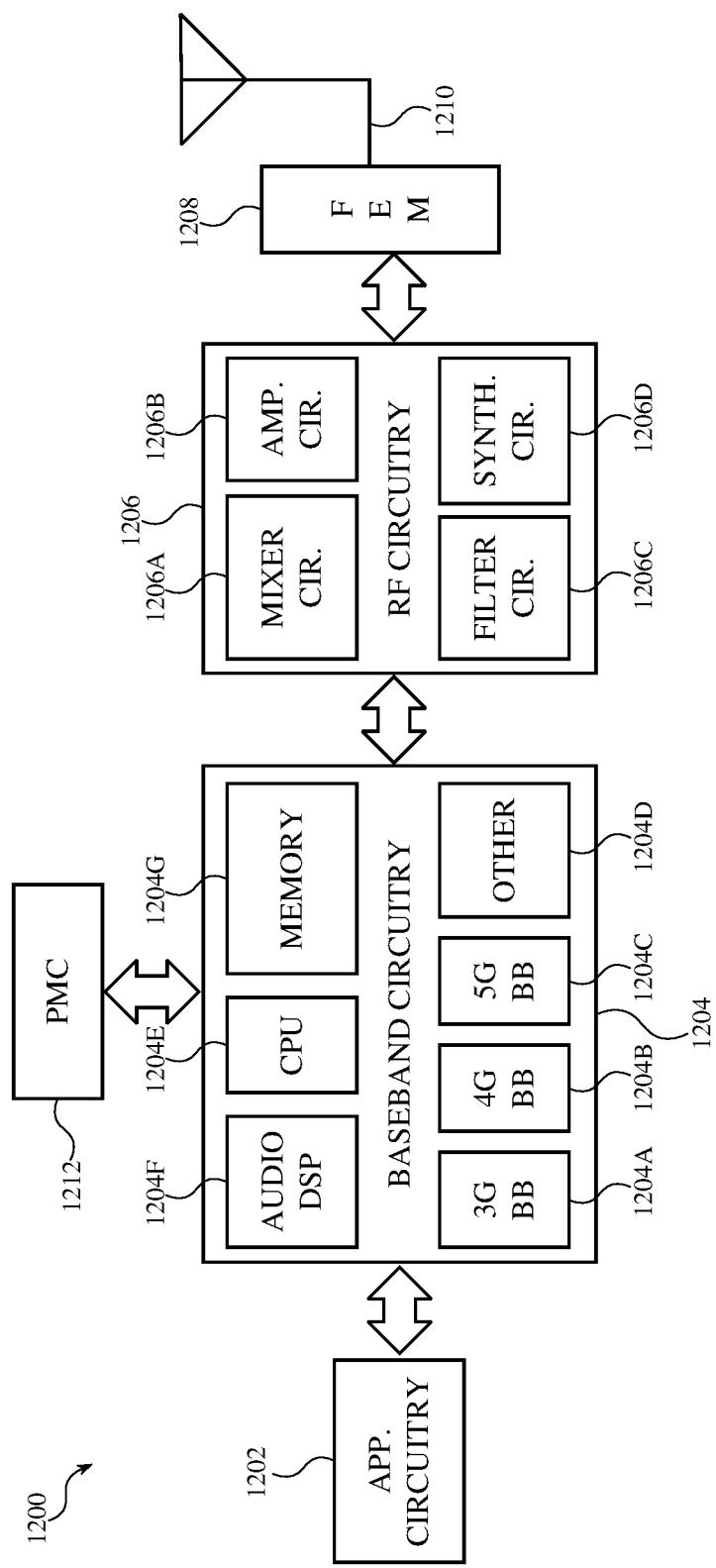
FIG. 12 is a diagram of an example of components of a device according to one or more implementations described herein.

FIG. 12 is a diagram of an example of components of a device 1200 according to one or more implementations described herein. In some implementations, the device 1200 can include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 can be included in a UE or a RAN node. In some implementations, device 1200 can include fewer elements (e.g., a RAN node may not utilize application circuitry 1202, and instead include a processor/controller to process IP data received from a CN such as 5GC 130 or an Evolved Packet Core (EPC)). In some implementations, device 1200 can include additional elements such as, for example, memory/storage, display, camera, sensor (including one or more temperature sensors, such as a single temperature sensor, a plurality of temperature sensors at different locations in device 1200, etc.), or input/output (I/O) interface. In other implementations, the components described below can be included in more than one device (e.g., said circuitries can be separately included in more than one device for Cloud-RAN (C-RAN) implementations).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1200. In some implementations, processors of application circuitry 1202 can process IP data packets received from an EPC.

The baseband circuitry 1204 can include circuitry such as, but not limited to, one or more single-core or multi-core processors. The baseband circuitry 1204 can include one or more baseband processors or control logic to process baseband signals received from a receive signal path of the RF circuitry 1206 and to generate baseband signals for a transmit signal path of the RF circuitry 1206. Baseband circuitry 1204 can interface with the application circuitry 1202 for generation and processing of the baseband signals and for controlling operations of the RF circuitry 1206. For example, in some implementations, the baseband circuitry 1204 can include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) can handle various radio control functions that enable communication with one or more radio networks via the RF circuitry 1206. In other implementations, some or all of the functionality of baseband processors 1204A-D can be included in modules stored in the memory 1204G and executed via a Central Processing Unit (CPU) 1204E. The radio control functions can include, but are not limited to, signal modulation/demodulation, encoding/decoding, radio frequency shifting, etc. In some implementations, modulation/demodulation circuitry of the baseband circuitry 1204 can include Fast-Fourier Transform (FFT), precoding, or constellation mapping/demapping functionality. In some implementations, encoding/decoding circuitry of the baseband circuitry 1204 can include convolution, tail-biting convolution, turbo, Viterbi, or Low Density Parity Check (LDPC) encoder/decoder functionality. Implementations of modulation/demodulation and encoder/decoder functionality are not limited to these examples and can include other suitable functionality in other implementations.

In some implementations, the baseband circuitry 1204 can include one or more audio digital signal processor(s) (DSP) 1204F. The audio DSP(s) 1204F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1204 and the application circuitry 1202 can be implemented together such as, for example, on a system on a chip (SOC).

In some implementations, the baseband circuitry 1204 can provide for communication compatible with one or more radio technologies. For example, in some implementations, the baseband circuitry 1204 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various implementations, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some implementations, the receive signal path of the RF circuitry 1206 can include mixer circuitry 1206a, amplifier circuitry 1206b and filter circuitry 1206c. In some implementations, the transmit signal path of the RF circuitry 1206 can include filter circuitry 1206c and mixer circuitry 1206a. RF circuitry 1206 can also include synthesizer circuitry 1206d for synthesizing a frequency for use by the mixer circuitry 1206a of the receive signal path and the transmit signal path. In some implementations, the mixer circuitry 1206a of the receive signal path can be configured to down-convert RF signals received from the FEM circuitry 1208 based on the synthesized frequency provided by synthesizer circuitry 1206d. The amplifier circuitry 1206b can be configured to amplify the down-converted signals and the filter circuitry 1206c can be a low-pass filter (LPF) or band-pass filter (BPF) configured to remove unwanted signals from the down-converted signals to generate output baseband signals. Output baseband signals can be provided to the baseband circuitry 1204 for further processing. In some implementations, the output baseband signals can be zero-frequency baseband signals, although this is not a requirement. In some implementations, mixer circuitry 1206a of the receive signal path can comprise passive mixers, although the scope of the implementations is not limited in this respect.

In some implementations, the mixer circuitry 1206a of the transmit signal path can be configured to up-convert input baseband signals based on the synthesized frequency provided by the synthesizer circuitry 1206d to generate RF output signals for the FEM circuitry 1208. The baseband signals can be provided by the baseband circuitry 1204 and can be filtered by filter circuitry 1206c.

In some implementations, the mixer circuitry 1206a of the receive signal path and the mixer circuitry 1206a of the transmit signal path can include two or more mixers and can be arranged for quadrature downconversion and upconversion, respectively. In some implementations, the mixer circuitry 1206a of the receive signal path and the mixer circuitry 1206a of the transmit signal path can include two or more mixers and can be arranged for image rejection (e.g., Hartley image rejection). In some implementations, the mixer circuitry 1206a of the receive signal path and the mixer circuitry 1206a can be arranged for direct downconversion and direct upconversion, respectively. In some implementations, the mixer circuitry 1206a of the receive signal path and the mixer circuitry 1206a of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode implementations, a separate radio IC circuitry can be provided for processing signals for each spectrum, although the scope of the implementations is not limited in this respect.

In some implementations, the synthesizer circuitry 1206d can be a fractional-N synthesizer or a fractional N/N+1 synthesizer, although the scope of the implementations is not limited in this respect as other types of frequency synthesizers can be suitable. For example, synthesizer circuitry 1206d can be a delta-sigma synthesizer, a frequency multiplier, or a synthesizer comprising a phase-locked loop with a frequency divider.

The synthesizer circuitry 1206d can be configured to synthesize an output frequency for use by the mixer circuitry 1206a of the RF circuitry 1206 based on a frequency input and a divider control input. In some implementations, the synthesizer circuitry 1206d can be a fractional N/N+1 synthesizer.

In some implementations, frequency input can be provided by a voltage controlled oscillator (VCO), although that is not a requirement. Divider control input can be provided by either the baseband circuitry 1204 or the application circuitry 1202 depending on the desired output frequency. In some implementations, a divider control input (e.g., N) can be determined from a look-up table based on a channel indicated by the application circuitry 1202.

Synthesizer circuitry 1206d of the RF circuitry 1206 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1206d can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210. In various implementations, the amplification through the transmit or receive signal paths can be done solely in the RF circuitry 1206, solely in the FEM circuitry 1208, or in both the RF circuitry 1206 and the FEM circuitry 1208.

In some implementations, the FEM circuitry 1208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210).

In some implementations, the PMC 1212 can manage power provided to the baseband circuitry 1204. In particular, the PMC 1212 can control power-source selection, voltage scaling, battery charging, or DC-to-DC conversion. The PMC 1212 can often be included when the device 1200 is capable of being powered by a battery, for example, when the device is included in a UE. The PMC 1212 can increase the power conversion efficiency while providing desirable implementation size and heat dissipation characteristics.

While FIG. 12 shows the PMC 1212 coupled only with the baseband circuitry 1204. However, in other implementations, the PMC 1212 may be additionally or alternatively coupled with, and perform similar power management operations for, other components such as, but not limited to, application circuitry 1202, RF circuitry 1206, or FEM circuitry 1208.

In some implementations, the PMC 1212 can control, or otherwise be part of, various power saving mechanisms of the device 1200. For example, if the device 1200 is in an RRC_Connected state, where it is still connected to the RAN node as it expects to receive traffic shortly, then it can enter a state known as Discontinuous Reception Mode (DRX) after a period of inactivity. During this state, the device 1200 can power down for brief intervals of time and thus save power.

If there is no data traffic activity for an extended period of time, then the device 1200 can transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1202 and processors of the baseband circuitry 1204 can be used to execute elements of one or more instances of a protocol stack. For example, processors of the baseband circuitry 1204, alone or in combination, can be used execute Layer 3, Layer 2, or Layer 1 functionality, while processors of the application circuitry 1202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 13:
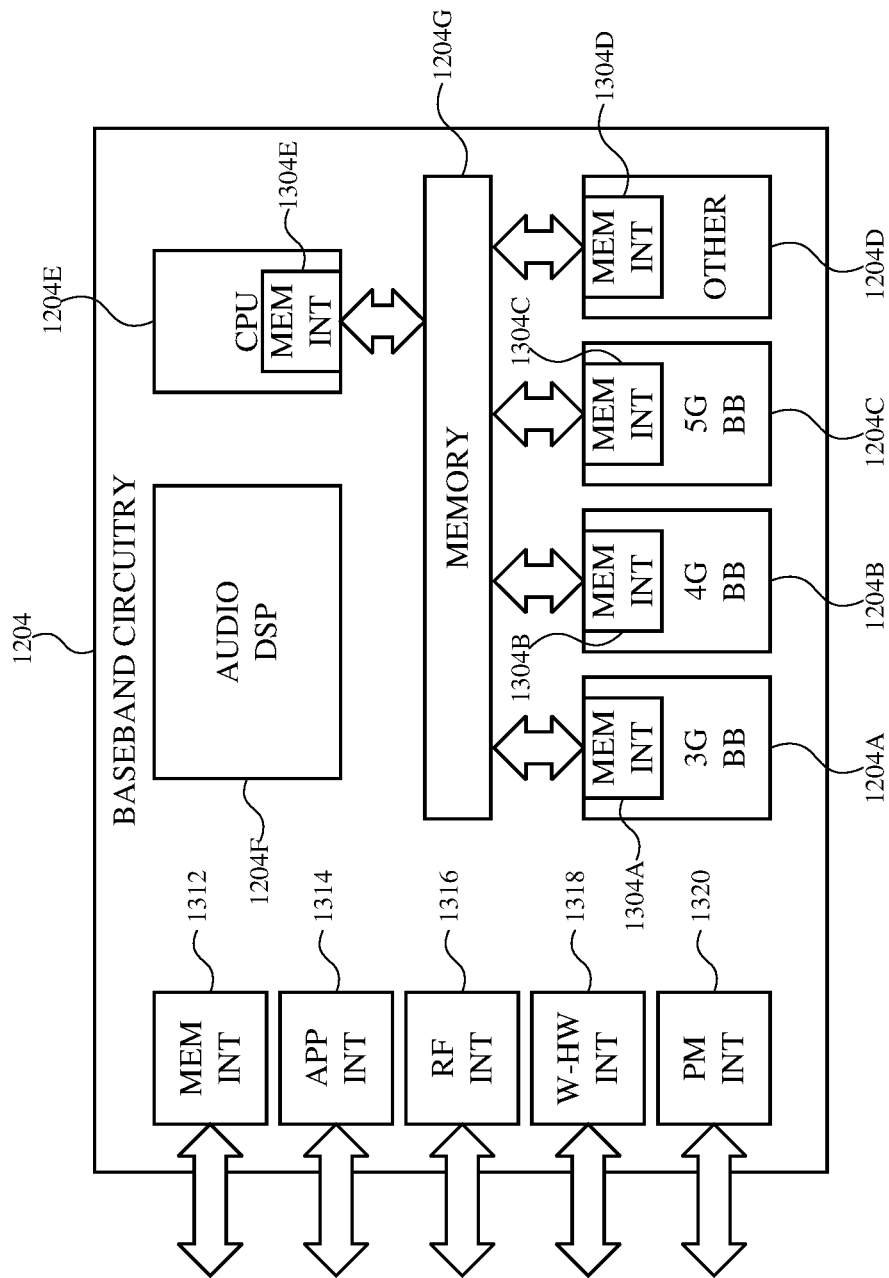
FIG. 13 is a diagram of example interfaces of baseband circuitry according to one or more implementations described herein.

FIG. 13 is a diagram of example interfaces of baseband circuitry according to one or more implementations described herein. As discussed above, the baseband circuitry 1204 of FIG. 12 can comprise processors 1204A to 1204E and a memory 1204G utilized by said processors. Each of the processors 1204A to 1204E can include a memory interface, 1304A to 1304E, respectively, to send/receive data to/from the memory 1204G.

The baseband circuitry 1204 can further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from application circuitry), an RF circuitry interface 1316 (e.g., an interface to send/receive data to/from RF circuitry), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from a PMC).

Figure 14:
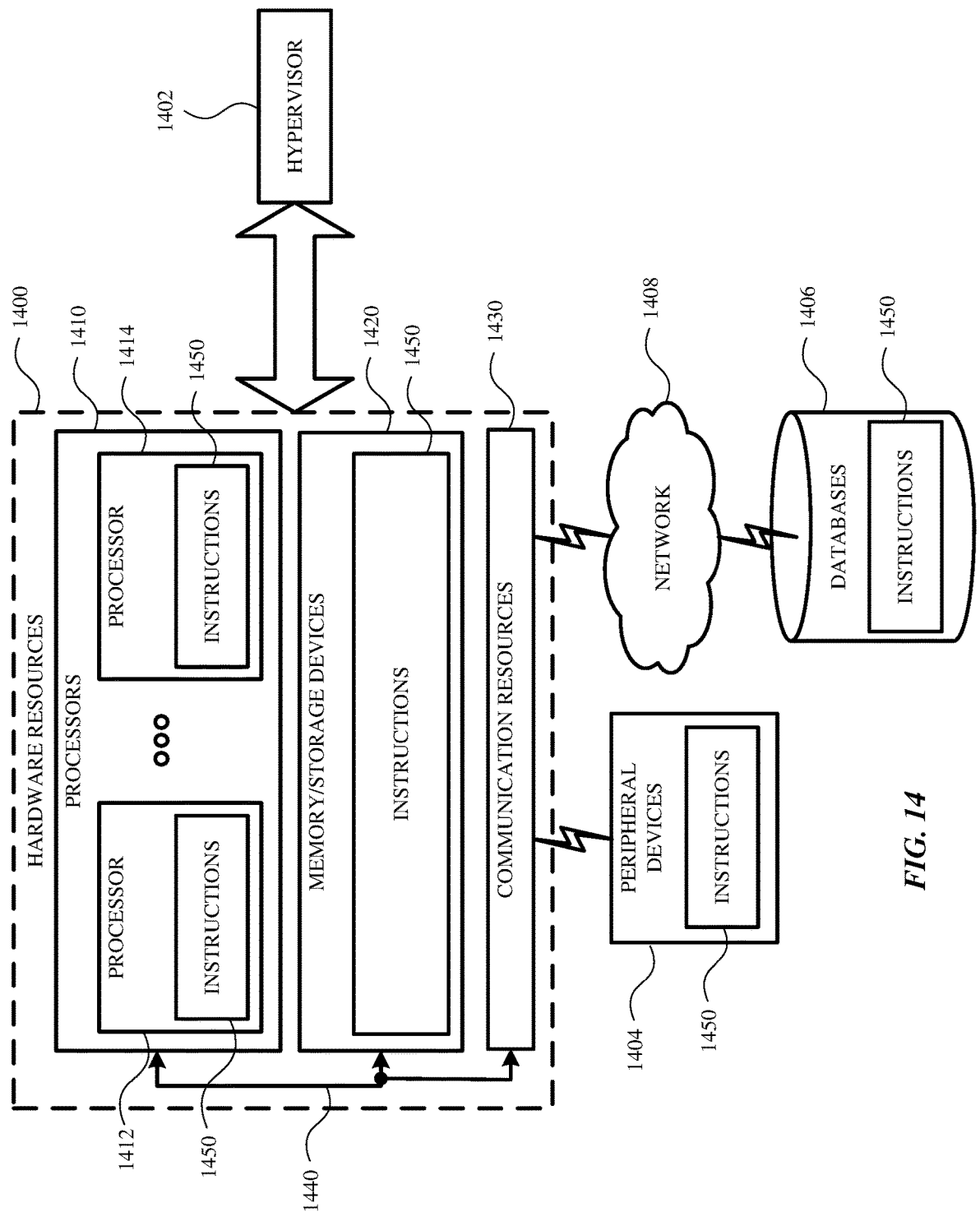
FIG. 14 is a block diagram illustrating components, according to some example embodiments, able to read instructions from a machine-readable or computer-readable medium (e.g., a non-transitory machine-readable storage medium) and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In some examples, a base station, comprising: radio frequency (RF) circuitry configured to communicate with a wireless communication network comprising a non-terrestrial network (NTN); a memory device configured to store instructions; and one or more processors, connected to the RF circuitry and memory device, and configured to perform the instructions to: detect a first satellite serving a physical cell, corresponding to a geographic area of the wireless communication network, wherein: the first satellite is identified by a first logical cell identity, and the physical cell is identified by a physical cell identity; and create, based on the first logical cell identity and the physical cell identity, a record of satellites serving the physical cell.

In some examples, which may be applied to one more other examples herein, the one or more processors are further configured to: detect a second satellite serving the physical cell, wherein the second satellite is identified by a second logical cell identity that is different from the first logical cell identity; and update, based on the second logical cell identity and the physical cell identity, the record to indicate the second satellite serving the physical cell.

In some examples, which may be applied to one more other examples herein, the one or more processors are further configured to: determine that the first satellite is no longer serving the physical cell; and update the record to indicate that the first satellite is not serving the physical cell.

In some examples, which may be applied to one more other examples herein, the physical cell corresponds to a cell global identity (CGI) comprising: a mobile country code (MCC); a mobile network code (MNC); a tracking area code (TAC); and the physical cell identity.

In some examples, which may be applied to one more other examples herein, the record comprises a logical cell global identity (LCGI) for each satellite currently serving the physical cell, each LCGI comprising: a mobile country code (MCC) of the physical cell; a mobile network code (MNC) of the physical cell; a tracking area code (TAC) of the physical cell; and a logical cell identity associated with the satellite.

In some examples, which may be applied to one more other examples herein, to detect that the first satellite is serving the physical cell, the one or more processors are to: determine, based on information received from a gateway of the NTN, that a coverage area of the first satellite overlaps with the physical cell.

In some examples, which may be applied to one more other examples herein, the one or more processors are further configured to: receive a paging request, directed to a User Equipment (UE), from a core network of the wireless communication network, the paging request indicating a tracking area corresponding to the physical cell; determine, based on the record, logical cell identities of the satellites serving the tracking area; and cause the satellites, serving the tracking area, to transmit a paging signal to the UE.

In some examples, which may be applied to one more other examples herein, the one or more processors are further configured to: determine that the satellite has moved from a first country to a second country update the logical cell identity of the satellite based on the satellite moving from the first country to the second country; and update the record based on the updated logical cell identity.

In some examples, which may be applied to one more other examples herein, baseband (BB) circuitry of a base station, may comprise: one or more processors configured to: detect a first satellite serving a physical cell, corresponding to a geographic area of the wireless communication network, wherein: the first satellite is identified by a first logical cell identity, and the physical cell is identified by a physical cell identity; and create, based on the first logical cell identity and the physical cell identity, a record of satellites serving the physical cell.

In some examples, which may be applied to one more other examples herein, baseband (BB) circuitry of a base station, may comprise: means for detecting a first satellite serving a physical cell, corresponding to a geographic area of the wireless communication network, wherein: the first satellite is identified by a first logical cell identity, and the physical cell is identified by a physical cell identity; and means for creating, based on the first logical cell identity and the physical cell identity, a record of satellites serving the physical cell.

In some examples, which may be applied to one more other examples herein, further comprising: means for detecting a second satellite serving the physical cell, wherein second satellite is identified by a second logical cell identity that is different from the first logical cell identity; and means for updating, based on the second logical cell identity and the physical cell identity, the record to indicate the second satellite serving the physical cell.

In some examples, which may be applied to one more other examples herein, means for determining that the first satellite is no longer serving the physical cell; and means for updating the record to indicate that the first satellite is not serving the physical cell.

In some examples, which may be applied to one more other examples herein, wherein the physical cell corresponds to a cell global identity (CGI) comprising: a mobile country code (MCC); a mobile network code (MNC); a tracking area code (TAC); and the physical cell identity.

In some examples, which may be applied to one more other examples herein, wherein the record comprises a logical cell global identity (LCGI) for each satellite currently serving the physical cell, each LCGI comprising: a mobile country code (MCC) of the physical cell; a mobile network code (MNC) of the physical cell; a tracking area code (TAC) of the physical cell; and a logical cell identity associated with the satellite.

In some examples, which may be applied to one more other examples herein, means for detecting that the first satellite is serving the physical cell, comprises: means for determining, based on information received from a gateway of the NTN, that a coverage area of the first satellite overlaps with the physical cell.

In some examples, which may be applied to one more other examples herein, means for receiving a paging request, directed to a User Equipment (UE), from a core network of the wireless communication network, the paging request indicating a tracking area corresponding to the physical cell; means for determining, based on the record, logical cell identities of the satellites serving the tracking area; and means for causing the satellites, serving the tracking area, to transmit a paging signal to the UE.

In some examples, which may be applied to one more other examples herein, means for determining that the satellite has moved from a first country to a second country; means for updating the logical cell identity of the satellite based on the satellite moving from the first country to the second country; and means for updating the record based on the updated logical cell identity.

In some examples, which may be applied to one more other examples herein, a method, performed by a base station, the method comprising: detecting a first satellite serving a physical cell, corresponding to a geographic area of the wireless communication network, wherein: the first satellite is identified by a first logical cell identity, and the physical cell is identified by a physical cell identity; and creating, based on the first logical cell identity and the physical cell identity, a record of satellites serving the physical cell In some examples, which may be applied to one more other examples herein, a method may further comprise detecting a second satellite serving the physical cell, wherein the second satellite is identified by a second logical cell identity that is different from the first logical cell identity; and updating, based on the second logical cell identity and the physical cell identity, the record to indicate the second satellite serving the physical cell.

In some examples, which may be applied to one more other examples herein, a method may further comprise: determining that the first satellite is no longer serving the physical cell; and updating the record to indicate that the first satellite is not serving the physical cell.

In some examples, which may be applied to one more other examples herein, the physical cell corresponds to a cell global identity (CGI) comprising: a mobile country code (MCC); a mobile network code (MNC); a tracking area code (TAC); and the physical cell identity In some examples, which may be applied to one more other examples herein, the record comprises a logical cell global identity (LCGI) for each satellite currently serving the physical cell, each LCGI comprising: a mobile country code (MCC) of the physical cell; a mobile network code (MNC) of the physical cell; a tracking area code (TAC) of the physical cell; and a logical cell identity associated with the satellite.

In some examples, which may be applied to one more other examples herein, detecting that the first satellite is serving the physical cell, comprises: determining, based on information received from a gateway of the NTN, that a coverage area of the first satellite overlaps with the physical cell.

In some examples, which may be applied to one more other examples herein, a method may further comprise: receiving a paging request, directed to a User Equipment (UE), from a core network of the wireless communication network, the paging request indicating a tracking area corresponding to the physical cell; determining, based on the record, logical cell identities of the satellites serving the tracking area; and causing the satellites, serving the tracking area, to transmit a paging signal to the UE.

In some examples, which may be applied to one more other examples herein, a method may further comprise: determining that the satellite has moved from a first country to a second country; updating the logical cell identity of the satellite based on the satellite moving from the first country to the second country; and updating the record based on the updated logical cell identity.

In some examples, which may be applied to one more other examples herein, a base station, comprising: radio frequency (RF) circuitry configured to communicate with a wireless communication network comprising a non-terrestrial network (NTN); a memory device configured to store instructions; and one or more processors, connected to the RF circuitry and memory device, and configured to perform the instructions to: determine a physical cell of a satellite of the NTN, wherein: the satellite is identified by a logical cell identity, and the physical cell corresponds to a current geographic coverage area of the satellite, determine one or more tracking areas, of the wireless communication network, corresponding to the physical cell; and create, based on the logical cell identity and the one or more tracking areas, a record of tracking areas currently served by the satellite.

In some examples, which may be applied to one more other examples herein, the one or more processors are further configured to: update the physical cell based on a change in the current geographic coverage area of satellite; update, based on the updated physical cell, the record of tracking areas currently served by the satellite.

In some examples, which may be applied to one more other examples herein, the record comprises a logical cell global identity (LCGI) for each tracking area currently served by the satellite, each LCGI comprising: a mobile country code (MCC); a mobile network code (MNC); a tracking area code (TAC); and the logical cell identity associated with the satellite.

In some examples, which may be applied to one more other examples herein, to determine the physical cell of the satellite, the one or more processors are further configured to: determine the current geographic coverage area based on ephemeris data of the satellite.

In some examples, which may be applied to one more other examples herein, the one or more processors are further configured to: receive a paging request, directed to a User Equipment (UE), from a core network of the wireless communication network, the paging request indicating a tracking area corresponding to the physical cell; determine, based on the record, that the satellite is currently serving the tracking area of the paging request; and cause, in accordance with the paging request, the satellite to transmit a paging signal to the UE.

In some examples, which may be applied to one more other examples herein, the one or more processors are further configured to: determine that the satellite has moved from a first country to a second country update the logical cell identity of the satellite based on the satellite moving from the first country to the second country; and update the record based on the updated logical cell identity.

In some examples, which may be applied to one more other examples herein, a base station, comprising: means for determining a physical cell of a satellite of the NTN, wherein: the satellite is identified by a logical cell identity, and the physical cell corresponds to a current geographic coverage area of the satellite, means for determine one or more tracking areas, of the wireless communication network, corresponding to the physical cell; and create, based on the logical cell identity and the one or more tracking areas, a record of tracking areas currently served by the satellite.

In some examples, which may be applied to one more other examples herein, the base station may comprise means for updating the physical cell based on a change in the current geographic coverage area of satellite; update, based on the updated physical cell, the record of tracking areas currently served by the satellite.

In some examples, which may be applied to one more other examples herein, the record comprises a logical cell global identity (LCGI) for each tracking area currently served by the satellite, each LCGI comprising: a mobile country code (MCC); a mobile network code (MNC); a tracking area code (TAC); and the logical cell identity associated with the satellite.

In some examples, which may be applied to one more other examples herein, the base station may comprise means for determining the physical cell of the satellite, and means for determining the current geographic coverage area based on ephemeris data of the satellite.

In some examples, which may be applied to one more other examples herein, the base station may comprise In some examples, which may be applied to one more other examples herein, means for receiving a paging request, directed to a User Equipment (UE), from a core network of the wireless communication network, the paging request indicating a tracking area corresponding to the physical cell; means for determining, based on the record, that the satellite is currently serving the tracking area of the paging request; and means for causing, in accordance with the paging request, the satellite to transmit a paging signal to the UE.

In some examples, which may be applied to one more other examples herein, the base station may comprise In some examples, which may be applied to one more other examples herein, means for determining that the satellite has moved from a first country to a second country update the logical cell identity of the satellite based on the satellite moving from the first country to the second country; and means for updating the record based on the updated logical cell identity.

In some examples, which may be applied to one more other examples herein, a computer-readable medium may include a storage device comprising instructions configured to cause one or more processors to perform one or more operations, or combination of operations of any of the examples described herein.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A base station, comprising:
   radio frequency (RF) circuitry configured to communicate with a wireless communication network comprising a non-terrestrial network (NTN);
   a memory device configured to store instructions; and
   one or more processors, connected to the RF circuitry and the memory device, and configured to perform the instructions to:
   detect a first satellite serving a physical cell, corresponding to a geographic area of the wireless communication network, wherein:
      the first satellite is identified by a first logical cell identity, and
      the physical cell is identified by a physical cell identity;
   create, based on the first logical cell identity and the physical cell identity, a record of satellites serving the physical cell;
   determine that the first satellite has moved from a first country to a second country;
   update the first logical cell identity of the first satellite based on the first satellite moving from the first country to the second country; and
   update the record based on the updated first logical cell identity.

2. The base station of claim 1, wherein the one or more processors are further configured to:
   detect a second satellite serving the physical cell, wherein the second satellite is identified by a second logical cell identity that is different from the first logical cell identity; and
   update, based on the second logical cell identity and the physical cell identity, the record to indicate the second satellite serving the physical cell.

3. The base station of claim 1, wherein the one or more processors are further configured to:
   determine that the first satellite is no longer serving the physical cell; and
   update the record to indicate that the first satellite is not serving the physical cell.

4. The base station of claim 1, wherein the physical cell corresponds to a cell global identity (CGI) comprising:
   a mobile country code (MCC);
   a mobile network code (MNC);
   a tracking area code (TAC); and
   the physical cell identity.

5. The base station of claim 1, wherein the record comprises a logical cell global identity (LCGI) for each satellite currently serving the physical cell, each LCGI comprising:
   a mobile country code (MCC) of the physical cell;
   a mobile network code (MNC) of the physical cell;
   a tracking area code (TAC) of the physical cell; and
   a logical cell identity associated with the satellite.

6. The base station of claim 1, wherein, to detect that the first satellite is serving the physical cell, the one or more processors are to:
  determine, based on information received from a gateway of the NTN, that a coverage area of the first satellite overlaps with the physical cell.

7. The base station of claim 1, wherein the one or more processors are further configured to:
  receive a paging request, directed to a User Equipment (UE), from a core network of the wireless communication network, the paging request indicating a tracking area corresponding to the physical cell;
  determine, based on the record, logical cell identities of the satellites serving the tracking area; and
  cause the satellites, serving the tracking area, to transmit a paging signal to the UE.

8. The base station of claim 1, wherein the one or more processors are further configured to:
  receive a previous logical cell global identity (LCGI) for the first satellite from another base station, wherein the previous LCGI includes the first logical cell identity; and
  determine an updated LCGI for the first satellite that is based on the previous LCGI and that includes the first logical cell identity.

9. Baseband (BB) circuitry of a base station, the BB circuitry comprising:
  one or more processors configured to:
    detect a first satellite serving a physical cell, corresponding to a geographic area of a wireless communication network, wherein:
      the first satellite is identified by a first logical cell identity, and
      the physical cell is identified by a physical cell identity;
    create, based on the first logical cell identity and the physical cell identity, a record of satellites serving the physical cell;
    determine that the first satellite has moved from a first country to a second country;
    update the first logical cell identity of the first satellite based on the first satellite moving from the first country to the second country; and
    update the record based on the updated first logical cell identity.

10. The BB circuitry of claim 9, wherein the one or more processors are further configured to:
  detect a second satellite serving the physical cell, wherein the second satellite is identified by a second logical cell identity that is different from the first logical cell identity; and
  update, based on the second logical cell identity and the physical cell identity, the record to indicate the second satellite serving the physical cell.

11. The BB circuitry of claim 9, wherein the one or more processors are further configured to:
  determine that the first satellite is no longer serving the physical cell; and
  update the record to indicate that the first satellite is not serving the physical cell.

12. The BB circuitry of claim 9, wherein the physical cell corresponds to a cell global identity (CGI) comprising:
  a mobile country code (MCC);
  a mobile network code (MNC);
  a tracking area code (TAC); and
  the physical cell identity.

13. The BB circuitry of claim 9, wherein the record comprises a logical cell global identity (LCGI) for each satellite currently serving the physical cell, each LCGI comprising:
  a mobile country code (MCC) of the physical cell;
  a mobile network code (MNC) of the physical cell;
  a tracking area code (TAC) of the physical cell; and
  a logical cell identity associated with the satellite.

14. The BB circuitry of claim 9, wherein the wireless communication network comprises a non-terrestrial network (NTN), and wherein, to detect that the first satellite is serving the physical cell, the one or more processors are to:
  determine, based on information received from a gateway of the NTN, that a coverage area of the first satellite overlaps with the physical cell.

15. The BB circuitry of claim 9, wherein the one or more processors are further configured to:
  receive a paging request, directed to a User Equipment (UE), from a core network of the wireless communication network, the paging request indicating a tracking area corresponding to the physical cell;
  determine, based on the record, logical cell identities of the satellites serving the tracking area; and
  cause the satellites, serving the tracking area, to transmit a paging signal to the UE.

16. A method, performed by a base station, the method comprising:
  detecting a first satellite serving a physical cell, corresponding to a geographic area of a wireless communication network, wherein:
    the first satellite is identified by a first logical cell identity, and
    the physical cell is identified by a physical cell identity;
  creating, based on the first logical cell identity and the physical cell identity, a record of satellites serving the physical cell;
  determining that the first satellite has moved from a first country to a second country;
  updating the first logical cell identity of the first satellite based on the first satellite moving from the first country to the second country; and
  updating the record based on the updated first logical cell identity.

17. The method of claim 16, further comprising:
  detecting a second satellite serving the physical cell, wherein the second satellite is identified by a second logical cell identity that is different from the first logical cell identity; and
  updating, based on the second logical cell identity and the physical cell identity, the record to indicate the second satellite serving the physical cell.

18. The method of claim 16, further comprising:
  determining that the first satellite is no longer serving the physical cell; and
  updating the record to indicate that the first satellite is not serving the physical cell.

19. The method of claim 16, wherein the physical cell corresponds to a cell global identity (CGI) comprising:
  a mobile country code (MCC);
  a mobile network code (MNC);
  a tracking area code (TAC); and
  the physical cell identity.

20. The method of claim 16, further comprising:
  determining a first logical cell global identity (LCGI) for the first satellite, wherein the first LCGI comprises:
    a mobile country code (MCC) of the physical cell;
    a mobile network code (MNC) of the physical cell;

a tracking area code (TAC) of the physical cell; and
the first logical cell identity.

\* \* \* \* \*